Feb. 6, 1951 W. W. WAGNER, JR., ET AL 2,540,972
SHEET STACKING AND CONVEYING MACHINE
Filed Feb. 24, 1948 10 Sheets-Sheet 5
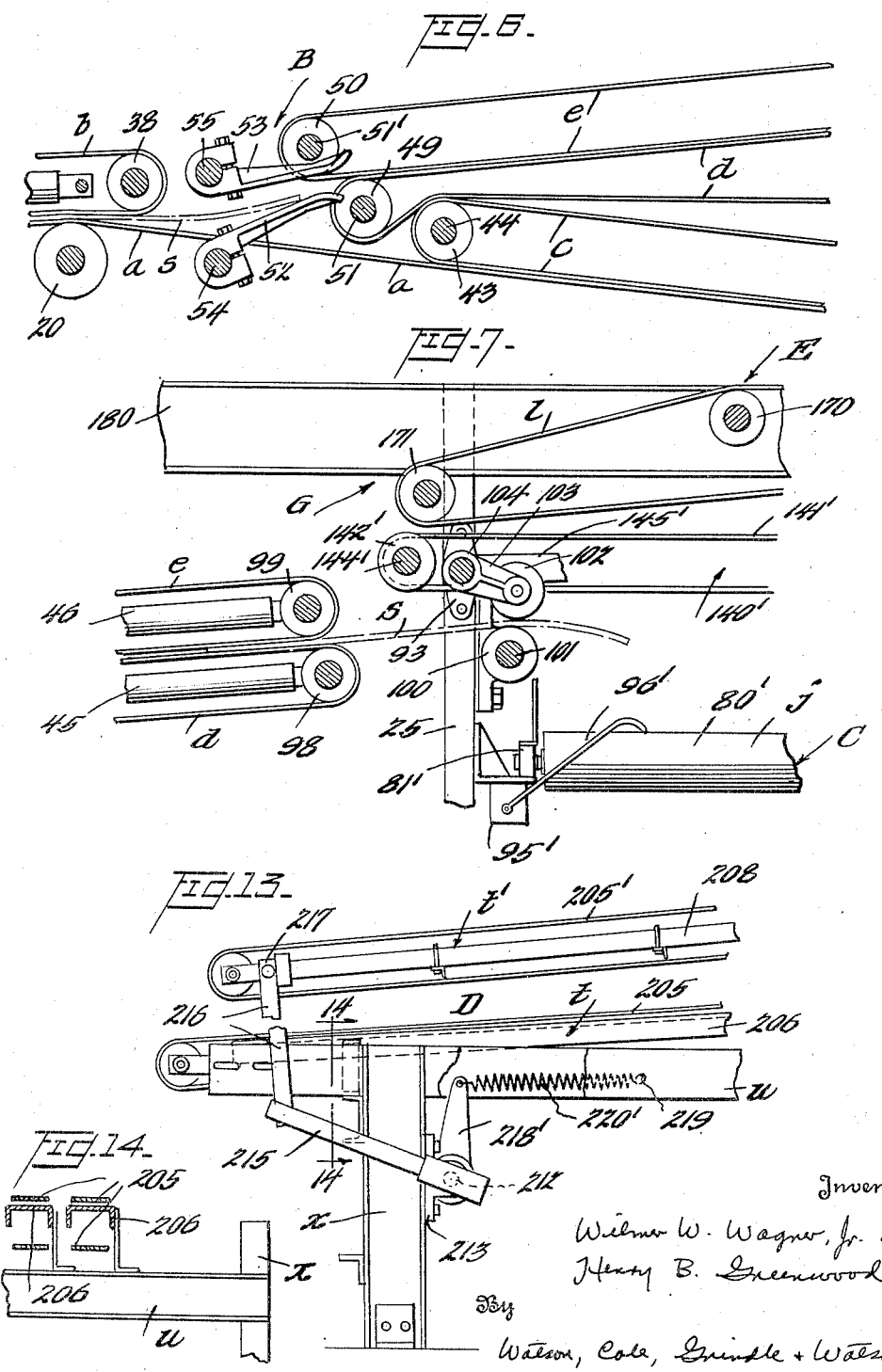

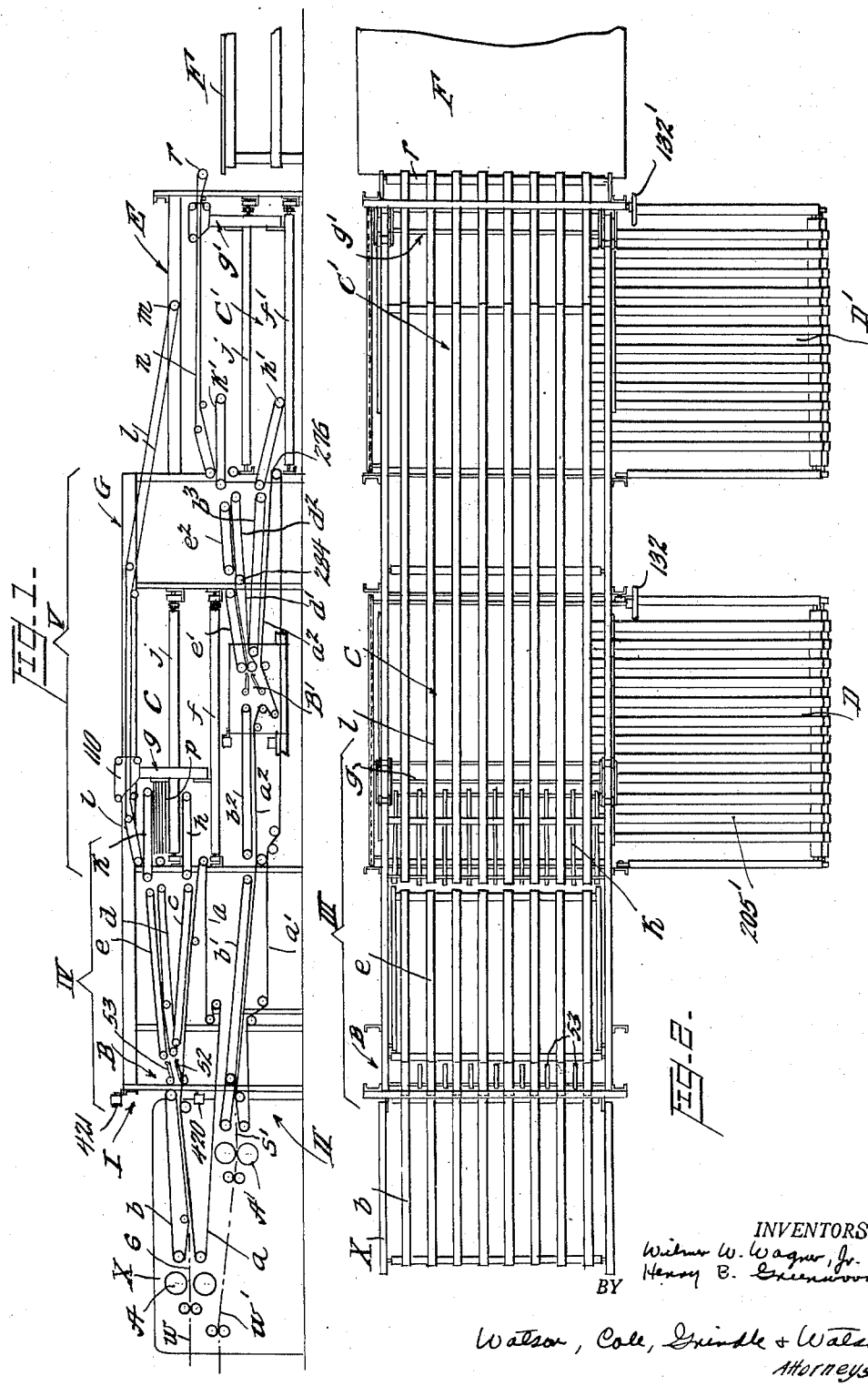

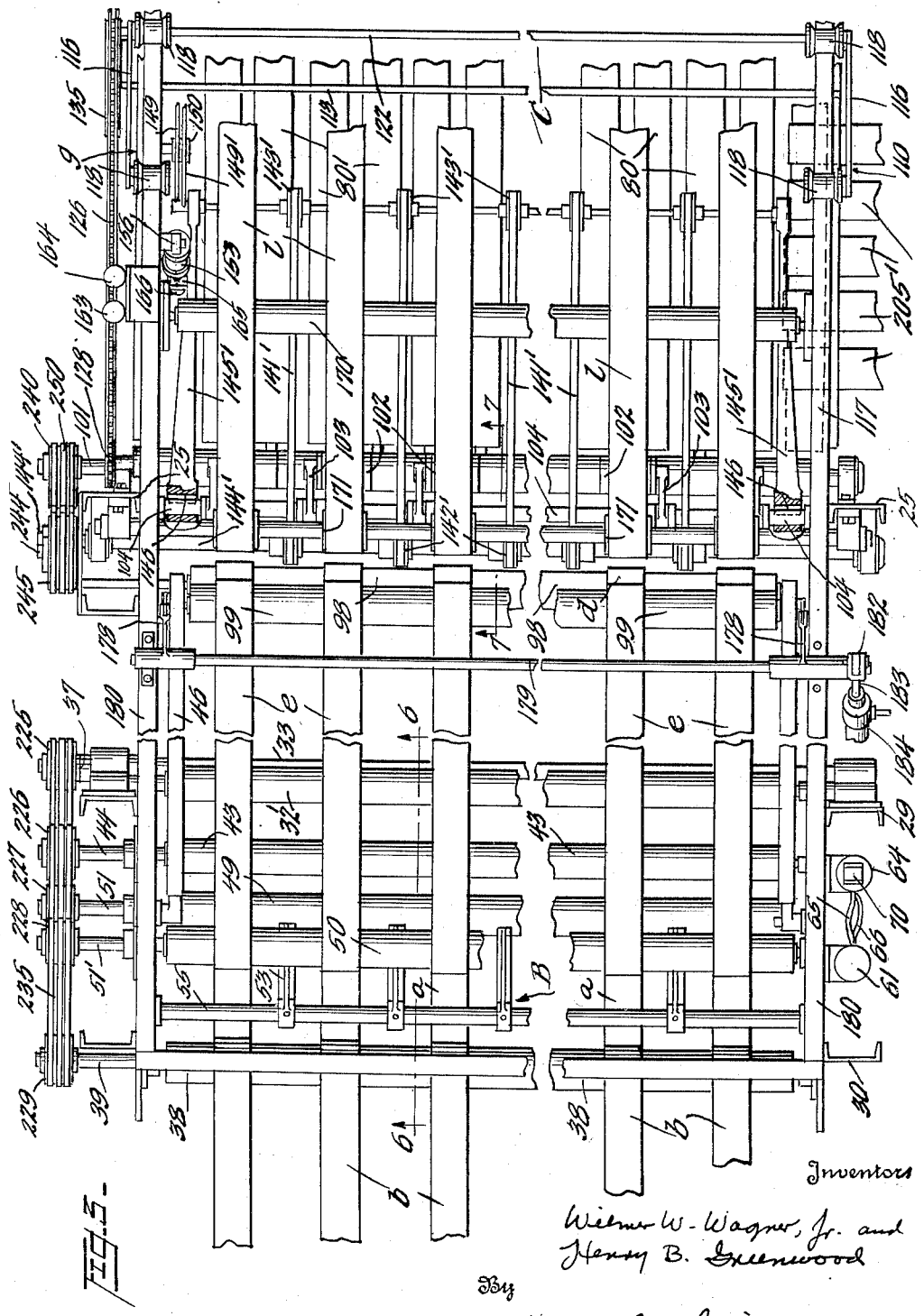

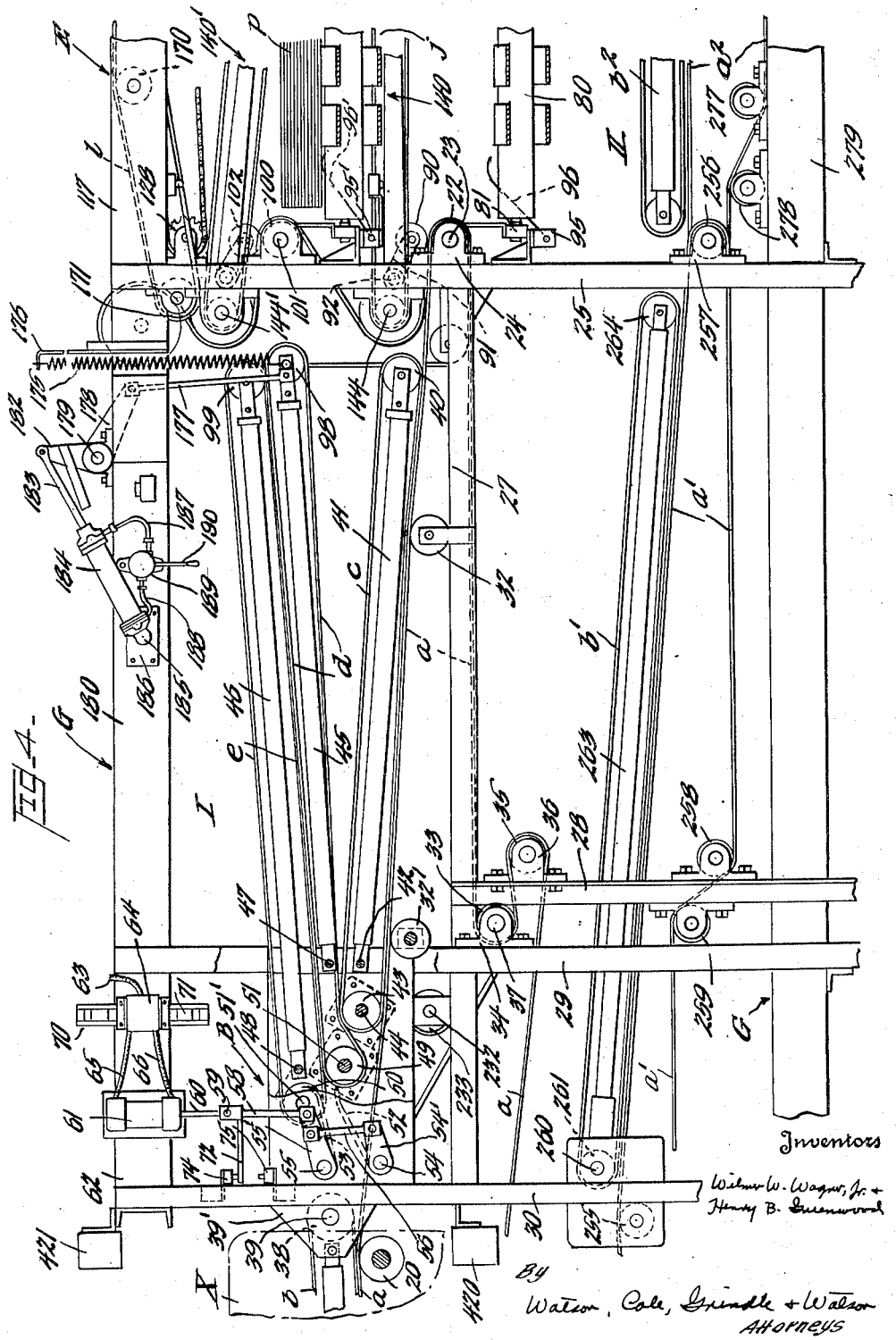

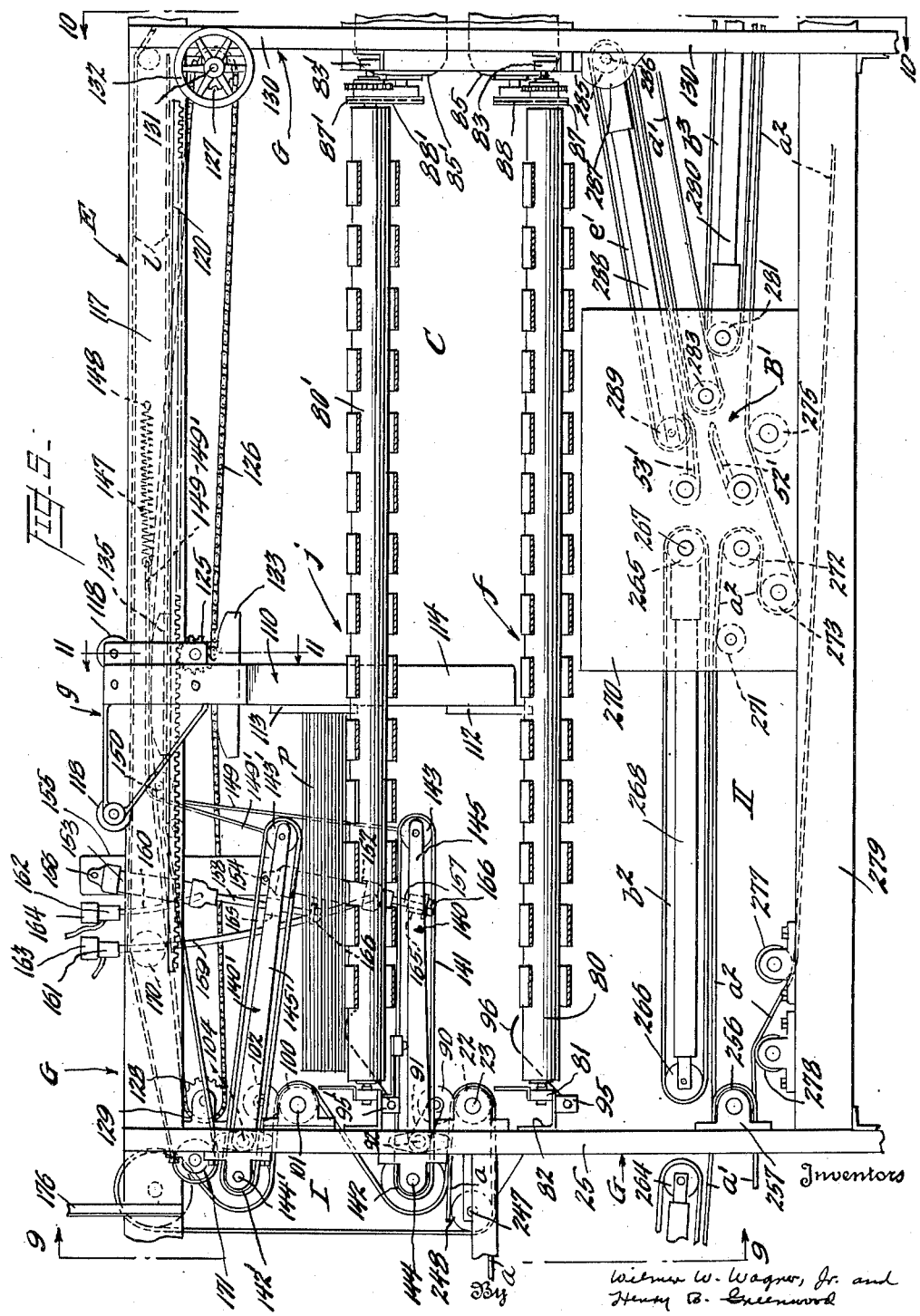

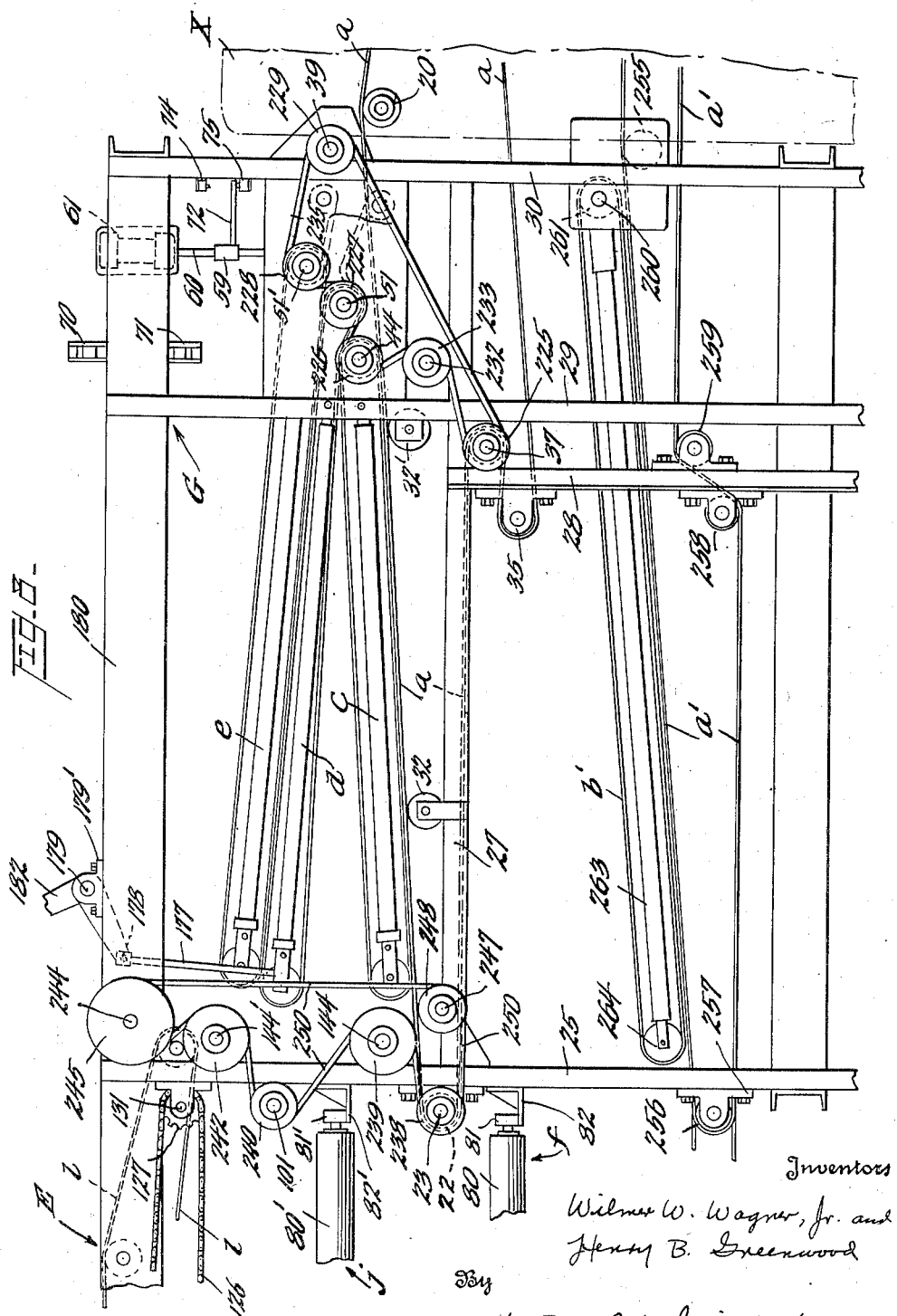

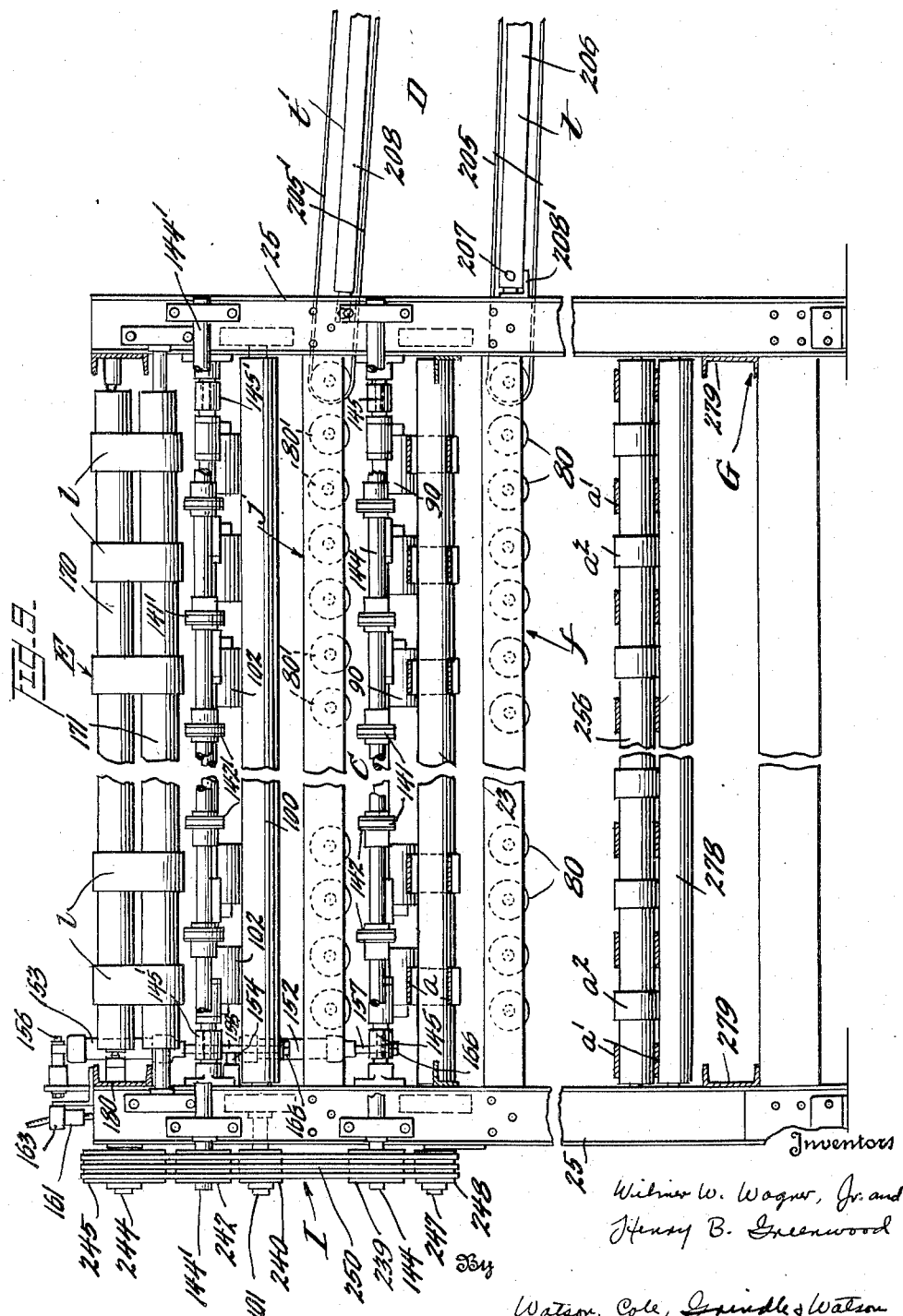

Feb. 6, 1951 W. W. WAGNER, JR., ET AL 2,540,972
SHEET STACKING AND CONVEYING MACHINE
Filed Feb. 24, 1948 10 Sheets-Sheet 8
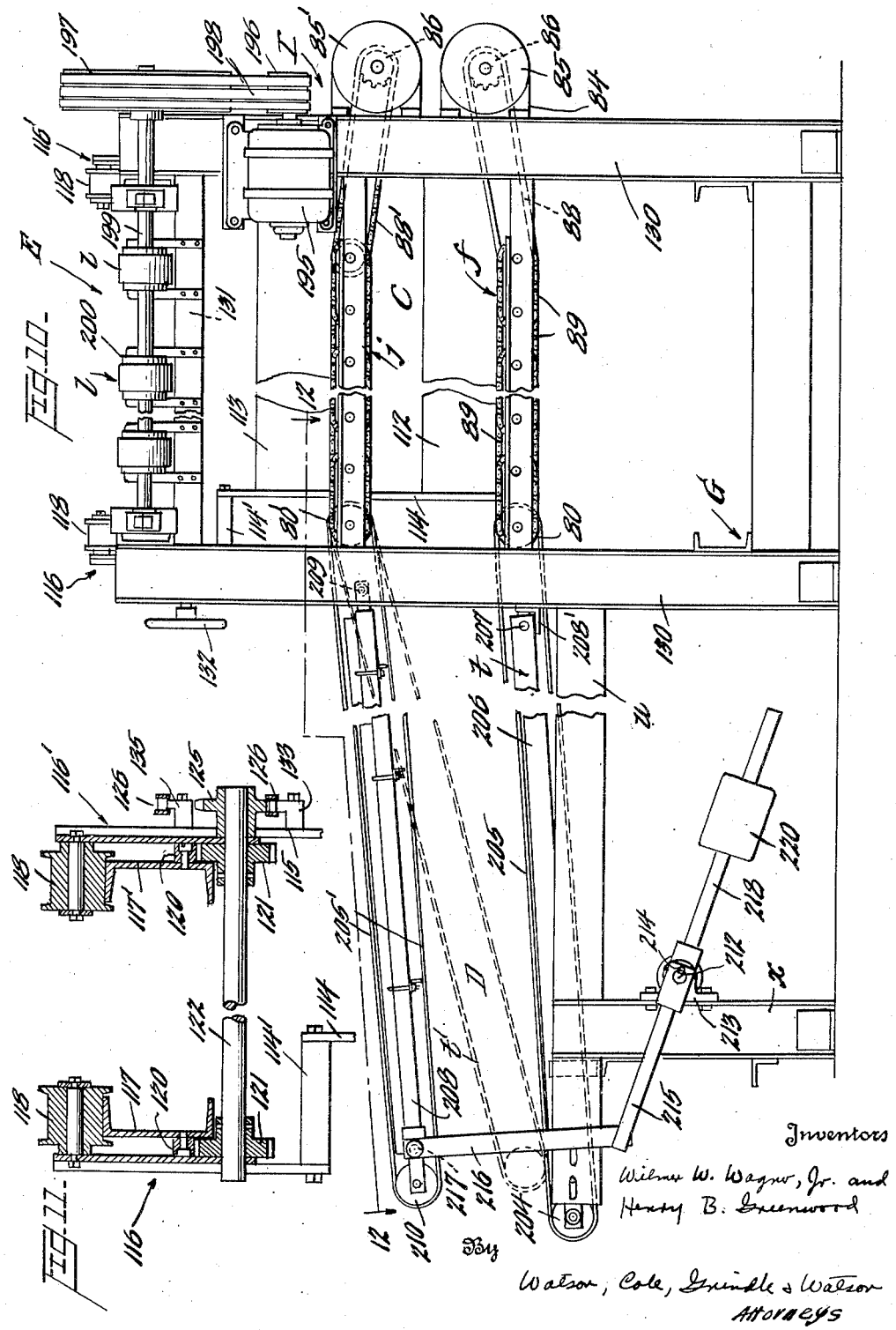
Inventors
Wilmer W. Wagner, Jr. and
Henry B. Greenwood
By Watson, Cole, Grindle & Watson
Attorneys

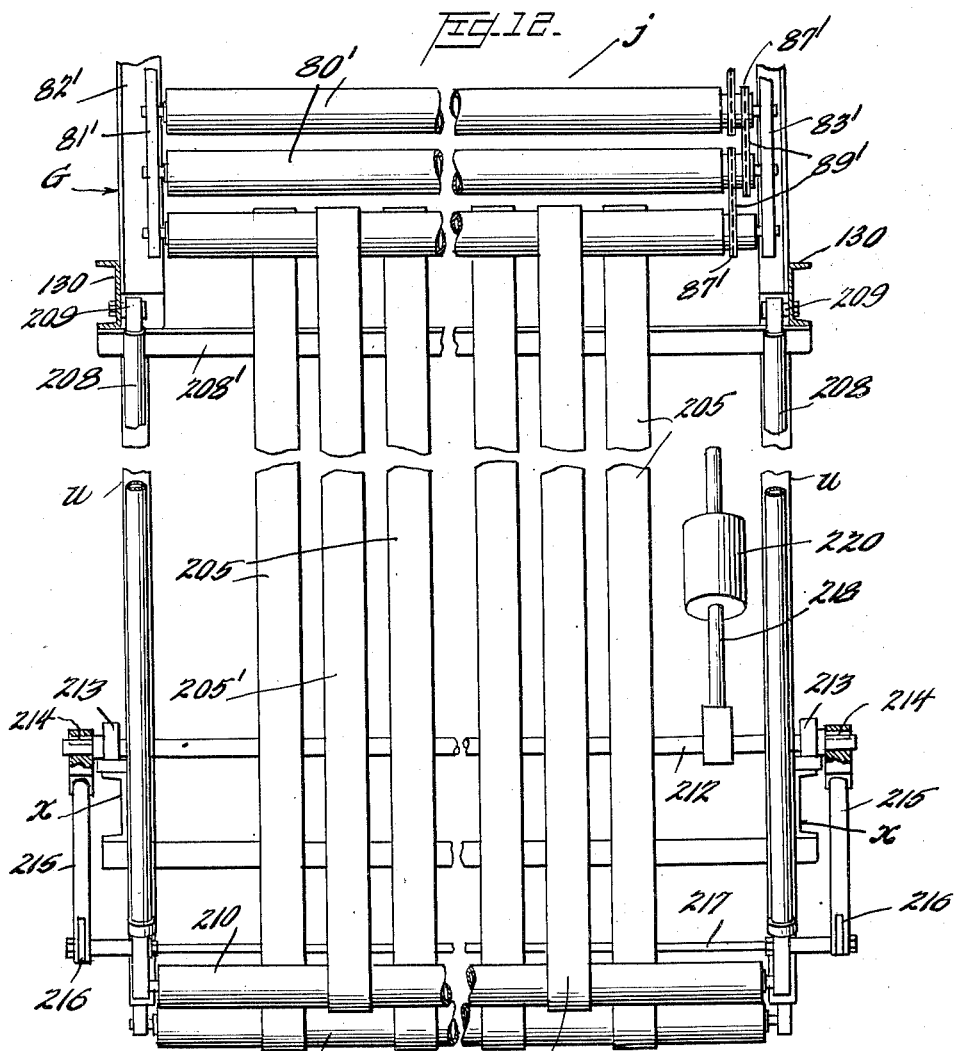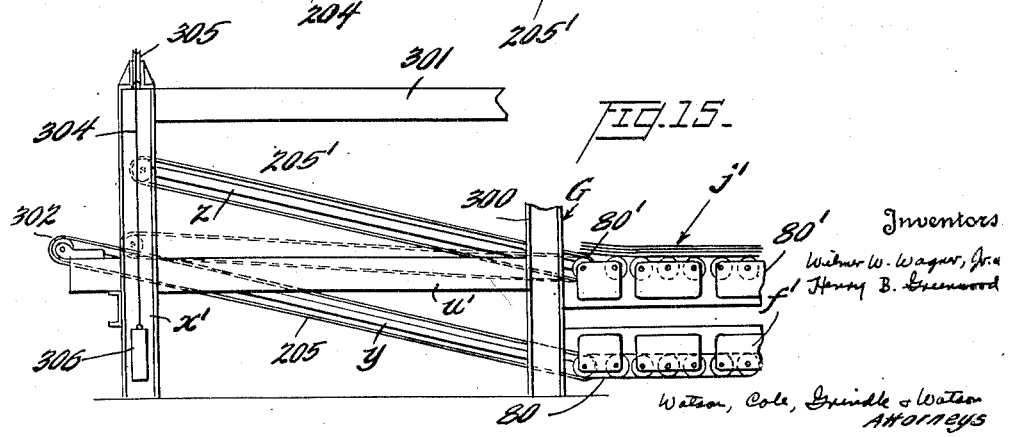

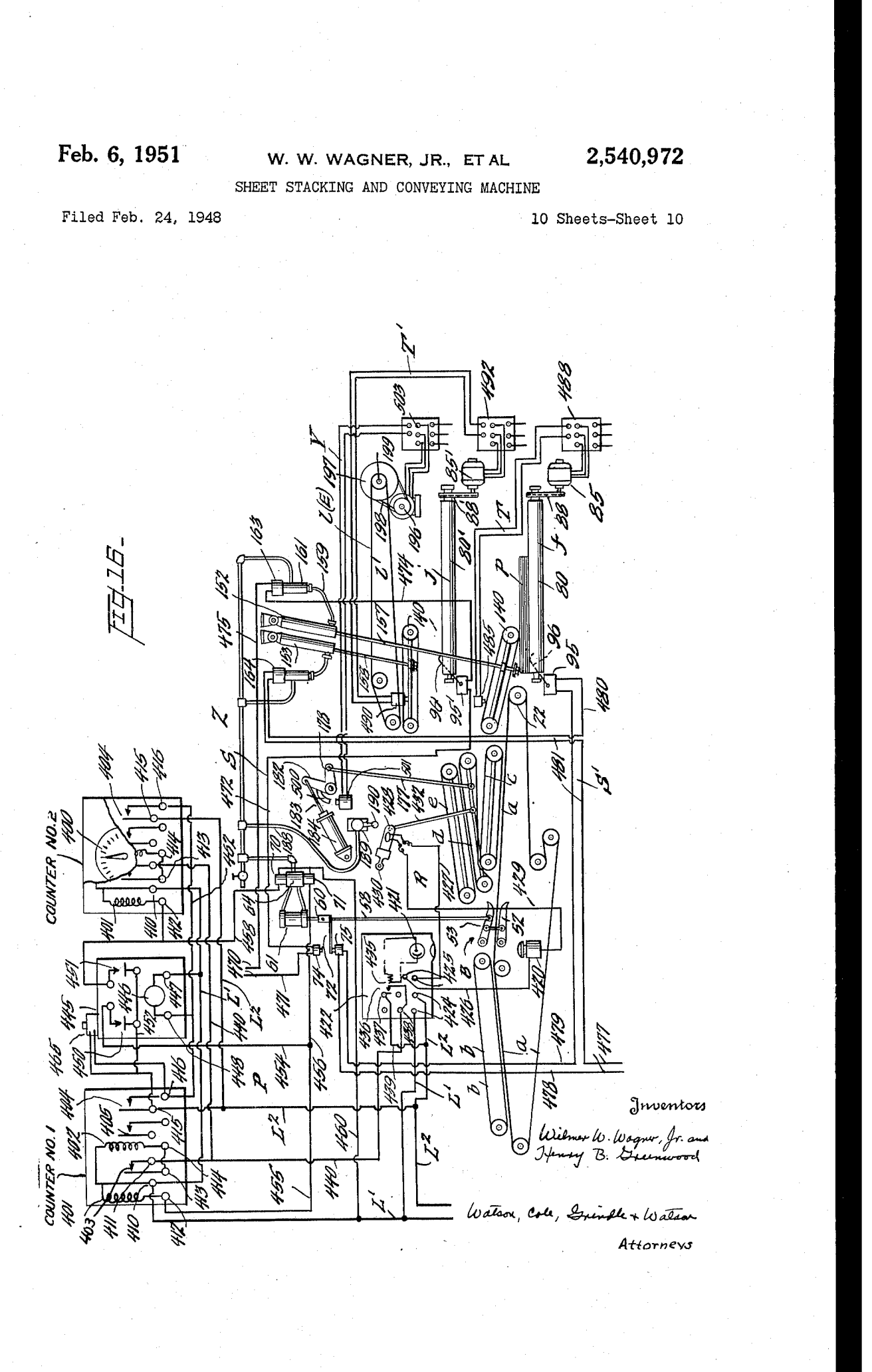

Patented Feb. 6, 1951

2,540,972

UNITED STATES PATENT OFFICE 2,540,972

SHEET STACKING AND CONVEYING MACHINE

Wilmer W. Wagner, Jr., and Henry B. Greenwood, Baltimore, Md., assignors to Samuel M. Langston Company, Camden, N. J., a corporation of New Jersey Application February 24, 1948, Serial No. 10,284

30 Claims. (Cl. 93—93)

This invention relates to conveyors and more particularly to conveyors for transporting and stacking sheet material and to automatic and manual controlling means for such conveyors.

The general object of the invention is to provide a novel and improved machine for receiving successive sheets of material, stacking them in piles each containing a predetermined number of sheets, and delivering the piles to a desired destination for storage, shipment, or use.

Another object of the invention is the provision of an improved machine of the class described which is mainly automatic in operation, which is provided with adjustable means for determining the number of units to be placed in each pile, and which is adapted for handling sheets of various sizes.

The present invention is particularly applicable to the receiving and stacking of severed sheets of corrugated board from a corrugating machine. The conventional machine for making corrugated paper board includes shears and slitter knives for cutting the freshly fabricated board into sheets of various sizes in accordance with the demands of the consumers. These corrugating machines run at a very rapid rate and difficulty has been experienced in the past in providing satisfactory high-speed automatic mechanism for handling and delivering the subdivided sections of the paper board as they come from the severing knives.

In common with the invention described in our copending application Serial No. 667,180, filed May 3, 1946, this invention involves basically the provision of a conveying and stacking machine which is almost completely automatic in operation, and which is arranged to receive the severed units, stack a specified number of them in piles, and transfer the completed piles toward the delivery end of the machine. A plurality of piling areas or zones are provided which are used in alternation, the sheets being received and stacked at one of such zones while one or more previously completed piles are being removed from others of such stacking zones. Automatic means are provided for shifting the delivery of units from one of the stacking points to the other in accordance with the number of sheets wanted in a stack, and the rate of delivery of the piles from the machine is synchronized with the rate of operation of the corrugator. Means are also provided for throwing out defective sheets before they can be forwarded to the pile being formed.

The present invention, however, presents several novel and improved features peculiar to itself and among them may be mentioned the following:

The invention contemplates the provision of a multiple stacking machine embodying novel structural and operational features facilitating the high-speed counting, stacking, and delivery of sheets of different dimensions from a plurality of sources such as corrugated board making machines or shears. Specifically, the arrangement consists of a dual or multiple system of sheet conveyors, preferably of the endless tape type, each providing alternately usable convergent paths leading to separate stacking areas upon which stacks are alternately formed for delivery to convenient points for storage, shipment, packing, or use. According to the present invention, the multiple stacking devices are integrated in a novel way into a compact organization, the units being partly superposed and partly in tandem, whereby the various operative elements will not interfere with each other, and the delivery conveyors of the entire mechanism may discharge the stacks at substantially the same level.

Another advantageous feature of the assembly, according to the present invention, is the provision of a discard conveyor system adapted to collect defective sheets or articles—such as "loose-backs" in the case of corrugated board handling—from all of the stacking units and discharge them at a common delivery point.

Another important feature of the invention is the partly automatic and partly manual system of controls provided for both the normal running of the machine and for the rejection and diverting of defective articles. These provisions include the automatic switch-over from one piling area to another when a stack of a predetermined number of articles is completed, this switch-over being accomplished by means of electrically operated counting devices which may be of any suitable or known type, but which are associated in a novel way for application to the problems peculiar to the functioning and purposes of the present invention. For example, novel means are provided for regularly and automatically shifting over the operation of the diverting member which distributes the articles to the alternately used stacking areas, the actuation of the respective hold-down devices associated with each of such areas, and the actuation of the carry-off conveyors at each of the areas for the discharge or delivery of the completed stacks, the operation of all of said means being under the control of the passage of the successive articles past a given point. In addition to these provisions, manually actuated means are provided for further diverting defective or unwanted articles from their normal path of movement to the stacking areas, or for similarly diverting all of the articles in case of an interruption in the operation of the piling machinery beyond this point of diversion. Such supplemental diverting means are also associated with the counting devices and automatic controls in a novel way so as to interrupt the count in progress, and either cancel out the incomplete count—which will result in a stack of fewer articles upon the instant stacking area—or temporarily suspend the count whereby the completion of the interrupted pile will be resumed when the discarding diversion is completed.

Other features of the invention include the provision of novel fluid pressure means for moving the shiftable elements of the machine, novel stop devices for the articles on the stacking conveyors, improved counterbalanced stack discharging conveyors, unique hold-down devices, and novel arrangements and details of the various conveyors and driving means therefore.

Further objects and features of novelty will be apparent from the following specification when read in connection with the accompanying drawings in which certain embodiments of the invention are illustrated by way of example.

In the drawings:

Figure 1 is a diagrammatic view in side elevation of an installation embodying the principles of the invention;

Figure 2 is a diagrammatic plan view of the installation;

Figure 3 is a partial top plan view on an enlarged scale of a portion of the installation, the extent of which is indicated by the bracket designated III in Figure 2;

Figure 4 is a partial side elevational view on an enlarged scale of the portion indicated by the bracket designated IV in Figure 1; parts of the machine broken away;

Figure 5 is a partial view in side elevation similar to Figure 4, but covering the area designated V in Figure 1, parts of the machine also being broken away in this view for clarity of illustration;

Figure 6 is a fragmentary view in vertical longitudinal section taken on line 6—6 of Figure 3;

Figure 7 is a fragmentary view in vertical longitudinal section taken on line 7—7 of Figure 3;

Figure 8 is a partial view in side elevation substantially co-extensive with Figure 4 but as seen from the opposite side of the machine;

Figure 9 is a vertical transverse sectional view taken on line 9—9 of Figure 5;

Figure 10 is a vertical transverse sectional view taken on line 10—10 of Figure 5;

Figure 11 is a vertical transverse sectional view taken on line 11—11 of Figure 5;

Figure 12 is a view substantially in horizontal section taken on line 12—12 of Figure 10;

Figure 13 is a fragmentary view in side elevation of the discharge end of a delivery conveyor for completed piles;

Figure 14 is a fragmentary sectional view taken on line 14—14 of Figure 13;

Figure 15 is a fragmentary and partly diagrammatic elevation of the machine as viewed at the delivery end, and showing the delivery conveyors serving the second or lower stacking unit; and Figure 16 is a diagrammatic view of the installation showing the various controlling devices and including wiring diagrams.

Referring more particularly to Figures 1 and 2 of the drawings, the principal units and subdivisions of the improved stacking machine will be described in a general way and the correlated functions thereof set forth. In Figure 1 the two superposed and longitudinally offset stacking units are designated respectively by the reference characters I and II, and the principal operative assemblies or subdivisions will be indicated by capital letters, the letters applied to the parts of unit II being primed. As previously indicated, the installation of the two units, in a single supporting frame and having provisions for discharging completed piles of sheets from one side of the machine at substantially the same level, and means for discarding rejected or defective sheets at a single point at one end of the machine, comprise important features of the invention.

The stacking machine is adapted to receive sheets $s$ and $s'$ from cutting knives or shears A and A' which are adapted to sever the sheets $s$ and $s'$ from continuous webs $w$ and $w'$ as they come from a fabricating machine which may be disposed beyond the left hand end of Figure 1. The shears A and A' may be parts of the fabricating machine itself, or they may comprise a separate machine supported by its own frame X.

In any event, the arrangement is such that the receiving conveyors of the stacking machine are directly associated with the shears or cutters A and A', and may if convenient be partly supported from and derive their driving force from the fabricating machine or the shears.

General arrangement

The principal operative subdivisions of the stacking machine proper are as follows: the intermittently shiftable diverting or distributing devices B and B'; the stacking zones C and C'; the pile delivery conveyor installations D and D'; the discharge or delivery conveyor system E for rejects or discards; the table F for receiving such discards; and the main supporting framework G.

From the shear A the sheets are moved by means of the cooperating tapes of belt conveyors $a$ and $b$ toward the distributing or diverting members indicated at B. Beyond the diverting or distributing device B, the sheets may take two courses. If the diverting or distributing elements are directed downwardly, the sheet follows along the tapes of conveyor $a$ beneath the cooperating confining tapes $c$; while if the distributor B is in its upward position, the sheets are passed between the tape or belt conveyors $d$ and $e$. From the lower course the sheets are deposited in stacked formation upon the stacking area $f$, the sheets being stopped at the proper points according to their length by means of the adjustable stop member $g$, and the pile being steadied and the formation thereof facilitated by the hold-down member $h$.

When the distributor device B delivers the sheets between the conveyors $d$ and $e$ the sheets are deposited upon the upper stacking area $j$ where they are stopped by the upper portion of the stop member $g$ and come under the influence of the hold-down device $k$. A stack $p$ is shown upon the upper level of the distributing area $j$ in Figure 1.

The stacking areas $f$ and $j$ each comprise a series of parallel driven rollers, the axes of which extend longitudinally of the machine, whereby upon rotation of the rollers the piles which are formed upon the areas $f$ and $j$ are moved laterally of the machine and deposited upon the delivery conveyors D.

The general arrangement and operation of the stacking machine is similar to the one illustrated in the above mentioned copending application, and it will be understood that the distributor, diverting, or switching device B is automatically moved to and from its two operative positions in accordance with the number of sheets which it is desired to deliver consecutively to a given stacking area to form a pile. In a manner generally similar to that described in the copending application, the conveyors comprising the stacking areas $f$ and $j$ are also driven in alternation so that a stack or pile previously formed on one of the areas may be discharged laterally upon one portion of the delivery conveyor assembly D while a pile is being formed on the other area while it is in an idle condition.

The lower unit II receives sheets $s'$ from the shear A' which is adapted to sever the continuous web $w'$ into predetermined lengths controlled by the relative speeds of the web and the shear blades. The sheets are moved between conveyor members $a'$ and $b'$. The upper or hold-down conveyor member $b2$ terminates adjacent the diverter or switch B', but the lower member $a2$ continues onward toward the piling area. When the diverter or switch element B' is in the lower position, the sheets pass between the further portion of the conveyor $a2$ and the hold-down tapes $b3$ from whence they are delivered to the lower stacking area $f'$, the position of the sheets being determined by the stop member $g'$ and the hold-down $h'$. On the other hand, when the diverters B' are in the upper position, the sheets pass between the conveyors $d'$ and $e'$. From this relatively short section, the sheets pass between conveyor members $d2$ and $e2$ from whence they normally fall upon the stacking area $j'$ of the stacking zone C', being under the control of the backstop member $g'$ and adapted to be acted upon by the hold-down member $k'$.

The conveyor rollers comprising the stacking areas $f'$ and $j'$ are alternately actuated to deliver the piles laterally to the delivery conveyor assemblies D', in the same way as the corresponding elements operate in the stacking unit I. Although the areas $f'$ and $j'$ of unit II are considerably lower than the corresponding areas $f$ and $j$ of the unit I, the delivery conveyor systems D and D' are provided with novel features which effect delivery from all of the stacking areas at substantially the same level. This will be described in detail at a later point in the specification.

An inspection of Figure 1 will show that economy of space is effected by the novel interrelation of the two units I and II wherein the sheets follow a single path for a good percentage of their travel in the lower unit II particularly while they are beneath the dual alternative stacking areas comprising the section C of unit I. The diverter or switch B' of unit number II is disposed toward the remote end of the stacking unit C of unit I so that the alternate paths of the second unit do not diverge widely until they reach a point beyond the first stacking area C; and the stacking area C' of the unit II with its two levels $f'$ and $j'$ is afforded *adequate space* well beyond the end of the stacking areas of the first unit. This arrangement, together with the novel delivery assemblies D and D', not only affords adequate room for the operation of the two units which may receive sheets from two fabricating machines, but also lays the basis for the provision of a common discard or reject delivery system which will now be described in a general way.

The mating conveyors $d$ and $e$ of unit I and the conveyor sections $d2$ and $e2$ of the unit II are pivoted adjacent their receiving ends so that the remote ends may be raised from the lower normal position in which they deliver sheets to the upper stacking areas $j$ and $j'$, to a discarding position whereby defective sheets may be diverted to the discard conveyor system E from which they may be discharged upon discard table F. The conveyors $d$ and $e$ of unit I discharge their discards or rejects upon the conveyor $l$ which is carried by the uppermost portion of the main supporting frame G and terminates adjacent the point $m$ upon the lower portion of the frame above the stacking area C' of the unit II. The mating conveyor sections $d2$ and $e2$ of unit II are similarly pivoted adjacent their receiving ends so that the discharge end may be raised from the normal lower operative position in which sheets are discharged upon the upper stacking level $j'$ of the stacking assemblies C' of unit II. In the raised position of these conveyors, the sheets are directed upon a discard conveyor $n$ which passes beyond the end point $m$ of the upper conveyor $l$ and terminates at the point $r$ where it discharges upon the table F. The discards from the conveyor $l$ may fall upon the conveyor $n$ beyond the point $m$ and discards from both units are discharged at the point $r$ from the conveyor $n$. Thus, by the staggered or offset arrangement of the units, a common discharge system for rejects, or for by-passing normal sheets under certain conditions, is afforded.

*Sheet distributor and stacker*

Proceeding now to the consideration of the mechanism in more detail, particularly as shown in the successive Figures 4 and 5 together with the detailed Figures 6 and 7, the construction and arrangement of the earlier stages of unit I will be described and explained. At the extreme left hand end of Figure 4 of the drawings a portion of the shear supporting sub-frame X is shown, this frame carrying the roller 20 upon which the tapes of the conveyor $a$ are adapted to run. Conveyor $a$ may be traced across the middle of Figure 4 to the roller 22 carried on the shaft 23 mounted on bracket 24 secured to the uprights 25 forming parts of the main frame G. Horizontal frame elements 27 extend between the uprights 25 and the posts 28 and then continue past the uprights 29 and terminate at the end posts 30 of the framework. The horizontal members 27 carry an idler roller 32 which lends support to the tapes or belts of the conveyor $a$. Another idler 32' is carried by another portion of the frame, for example the posts 29, and also aids in supporting the conveyor $a$. The tapes $a$ are trained around the roller 33 fixed on a cross shaft 37 supported by the brackets 34 and then around the roller 35 which is carried by the brackets 36, these brackets being suitably secured to adjacent portions of the framework G. The remainder of the return length of the conveyor $a$ may be traced to the left hand end of Figure 4, and thence by reference to Figure 1.

The hold-down conveyor $b$ which cooperates with the conveyor $a$ to guide the sheets from the shear A, is fragmentarily shown at the left hand end of Figure 4, the tapes comprising the conveyor b passing around the roller 38 fixed on a shaft 39 carried by the bracket 39' secured to the post 30.

The hold-down tapes c are clearly shown superposed above the portion of the conveyor a in Figure 4, these tapes c being trained about the roller 40 which is carried by the rods or struts 41 secured as at 42 to the posts 29. The tapes of the conveyor c are passed around the roller 43 fixed on a transverse shaft 44 which is rotatably mounted upon suitable brackets carried by the framework so that the tapes c cooperate with the tapes of the conveyor a in passing the sheets along the lower course of the unit I toward the stacking zone C. The conveyor d and the hold-down means e are also tape or belt conveyors carried respectively by rollers mounted at the ends of the struts 45 and 46, these struts being pivoted respectively at the points 47 and 48. At the left hand ends of the conveyors d and e the tapes are carried about rollers 49 and 50 respectively mounted upon shafts 51 and 51' rotatably carried by the framework. It will be noted that the lower run of the conveyor tapes d is bent around the roller 43 which carries the tapes c and some driving force may be asserted between the two conveyors by this arrangement. However, a belt or chain drive is provided for all of these conveyors which will be described presently.

It will be recalled that adjacent the diversion point B the path of the sheets through the unit I divides, the lower course being between the upper run of the conveyor a and the lower run of the conveyor c, and the upper course being between the respective upper and lower runs of the conveyors d and e. These points of entry between the respective mating pairs of conveyors will be clearly observed at the left hand side of Figure 4, and even more clearly in the enlarged view of Figure 6. The sheets s of course, emerge from between the upper run of the first position of conveyor a and the lower run of the conveyor b to the left of the posts 30. At this point they pass between the lower set of blades 52 and the upper blades 53 of the diverter mechanism B. These lower blades are secured to the cross shaft 54 supported in bearings in the main supporting frame G, and the upper blades 53 are fixed to the upper shaft 55. The shafts 54 and 55 have crank arms 54' and 55' secured to end portions thereof outside of the path of the sheets, and these stub crank arms are connected by means of the link 56 for parallel movement. In Figure 6 the blades are in their upper position and it will be seen that the curved lips at the remote ends thereof are so positioned that the sheet s is guided accurately between the flights d and e and are thus being diverted to the upper stacking area j of unit I. It will be clearly understood that when the blades 52 and 53 of the diverter B are moved to the lower position, the sheets will be diverted along the upper run of the conveyor a and beneath the lower run of the conveyor c and thus directed toward the lower stacking area f of unit I.

Means for raising and lowering the cooperating blades 52 and 53 of the diverter B comprise the link 58 which is connected at its lower end to the crank arm 55' and its upper end is pivoted as at 59 to the piston rod or plunger 60 which extends from a piston working in the compressed air cylinder 61 carried by the upper horizontal channel member 62 of the frame G. This fluid pressure actuated piston rod 60 is forced upwardly or downwardly depending upon which end of the cylinder 61 the supply of fluid pressure is admitted to, said fluid pressure being supplied from the pipe 63 leading from the line Z. A solenoid operated valve 64 directs the pressure either to the upper end of the cylinder 61 through the connection 65 or to the lower end through the connection 66. A solenoid 70 is disposed at the upper end of the valve 64 and the solenoid 71 is disposed at the lower end of the valve and each one is energized at the proper time in accordance with the automatic controls to be described later.

A switch actuating arm 72 extends from the diverter actuating linkage 58, 60 and is adapted to alternatively actuate the spaced limit switches 74 and 75 when the diverter blades are in their respective uppermost and lowermost positions. The connections and functions of these limit switches also will be described in connection with the automatic controls of the machine.

Referring now more particularly to the right hand side of Figure 4 and to Figure 5 of the drawings, it will be seen that the sheets are discharged from the end of conveyor a where the conveyor tapes pass around the end roller 22, onto the stacking area f, which area comprises the series of parallel rollers 80. These rollers are shown to good advantage in Figures 9 and 10 of the drawings as well as in Figure 5. It may be noted at this point that the last one of these rollers 80 adjacent the edge of the machine toward the discharge side thereof serves the function also of providing an end roller of the lower discharge conveyor t which forms a part of the primary discharge or delivery system D. These conveyors will be described in greater detail as the specification proceeds.

The rollers 80 of the stacking area f are rotatably mounted in bearings 81 carried as by means of brackets 82 secured to a portion of the frame G. The opposite ends of the rollers 80 are similarly mounted for rotation in suitably supported bearings 83. At the latter end of the stacking area there is secured as by brackets 84, the drive motor 85, which is preferably an electric motor having a pulley or sprocket 86 fixed upon the shaft thereof. Each of the rollers 80 are provided with a pair of sprockets 87. A drive chain 88 connects the motor sprocket 86 with the sprocket 87 of the first roller 80 and each of the rollers 80 are connected to an adjacent roller by means of short chains 89. By this means all of the rollers 80 of the stacking area f are driven in the same direction by the motor 85. The means for energizing the motor to drive the lateral conveyors which comprise the stacking area f in properly timed relation with the operation of the other parts of the machine, will be described in connection with the operation of the whole device.

As the sheets pass over the end roller 22 of the conveyor a they are pressed downwardly and guided to some degree by means of the transversely extending bearing roller 90 which is carried by end brackets 91 freely pivoted on the rock shaft 92 rockably supported upon the upright members 25 of the frame G as by means of the brackets 93. The bearing roller 90 is preferably made of aluminum which is a relatively light and soft metal, and thus damage to the sheets is minimized as they strike the roller and pass between it and the tapes of the conveyor a adjacent the roller 22.

An electric switch 95 is secured to the bracket 82 and has an actuating finger or feeler 96 which projects upwardly beyond the level of the rollers 80 so as to be moved downwardly from the position shown in Figure 5 whenever sheets begin piling up on the stacking area f. The function of this switch will be described later.

Sheets which are directed along the upper course of unit I by means of the diverters B pass from between the conveyors d and e at the right hand end thereof at the points where the tapes of these conveyors pass around the end rollers 98 and 99. When the conveyors are in the position shown in Figures 4 and 7 of the drawings the sheets s are directed over the feed roller 100 fixed on the shaft 101 which is rotatably carried by a bracket secured to the uprights or posts 25. An aluminum bearer roll 102 carried by end brackets 103 pivoted upon the rock shaft 104 supported upon the brackets 105 carried by the posts 25, bears downwardly upon the sheets in a manner similar to the roll 90 described in connection with the lower piling arrangement. As the sheets s issue from between the rollers 100 and 102 they fall upon the stacking area j which comprises the rollers 80' which are rotatably mounted in the bearings 81' and 83' in exactly the same way as the rollers 80 of the lower tier. An end one of the rollers 80' forms a terminal roller of the upper delivery conveyor t' of the delivery assembly D. The driving motor 85' furnishes power to the rollers through the transmission 86', 87', 88', as described in connection with the stacking area f. A switch 95' having an actuating finger 96' is provided at the left hand end of the area j similar to the elements designated by the unprimed numbers in connection with the other area.

The backstop member g is provided for limiting the movement of the sheets s on the stacking areas f and j and forming the further limit of pile p formed upon either of these areas. This stop device is best shown in Figures 5 and 11 of the drawings. The depending portion 110 of the device g comprises a lower stop wall 112 and an upper stop wall 113 extend transversely of the rollers 80 and 80' of the two stacking areas and provide means against which the sheets s forming the pile p abut. The ends of the walls or boards 112 and 113 are secured to the depnding posts 114 and 115. The post 114 is offset inwardly, as clearly shown in Figure 10, so as to pass between the end roller and the next to the end roller of the roller series 80' of the upper area j. This is done so as to prevent the post or upright 114 from interfering with the tapes of the upper delivery conveyor t', which pass around the end one of the rollers 80'. A transverse connection 114' connects the upper end of the post 114 with the carriage 116 disposed for longitudinal movement upon a channel side frame member 117 forming an upper portion of the framework G. The depending post or upright 115 at the opposite side of the machine is connected directly to the carriage 116' which rides upon the channel beam 117' as clearly shown in Figure 11. Each of the carriages 116 and 116' comprise flanged rollers 118 the flanges of which embrace the upper flanges of the channel tracks 117 and 117'. Along the outer faces of the webs of the channels 117 and 117' there are secured the horizontal racks 120 and the teeth of these racks are adapted to be engaged by those of the pinions 121 carried by the cross shaft 122 rotatably supported in the carriages 116 and 116'. Upon an extreme outer end of the shaft 122 there is keyed a drive sprocket 125 with which meshes an endless drive chain 126. The drive chain 126 is trained around the sprockets 127 and 128 rotatably mounted in suitable brackets such as indicated at 129 preferably carried by the posts 25 and 130 of the framework G. A shaft 131 extends from the sprocket 127 across the machine to the delivery side thereof, which is the side at which the operator stands, and upon the end of the shaft 127 there is secured a hand wheel 132. The lower run of the chain 126 which meshes with the teeth of the sprocket 125 is held in engagement with the sprocket by means of the guide shoe 133 suitably secured to the backstop assembly 110 and properly spaced from the sprocket 125. The upper or idle run of the chain 126 is loosely supported by the angle bracket 135 as shown in Figure 11. If desired suitable graduations may be marked along the rack 120 or the channel 117 and it will be readily understood that by rotation of the hand wheel 132 the chain 126 will be moved in either direction to travel the carriages 116 and 116' along the framework to position the stop elements 112 and 113 at the proper points depending upon the length of the sheets to be stacked.

In order to properly confine the sheets as they are being stacked and also to insure that they register at their forward ends against the stop plates 112 and 113 there is provided in association with each of the stacking area f and j the hold-down devices h and k. These devices are very similar in construction and comprise substantially short belt conveyor assemblies 140 and 140' the tapes 141 of which are trained about the rollers 142 and 142' and 143 and 143'. The rollers 142 and 142' are fixed on shafts 144 and 144' rotatably mounted in brackets carried by the posts 25, and the rollers 143 and 143' are rotatably and preferably adjustably mounted upon the ends of the side frame members 145 and 145' which are splined at 146 to the rock shafts 92 and 104, from which the rollers 90 and 102 swing. In this way, the remote ends of the hold-down or bearer devices may be raised and lowered so that the tapes 141 and 141' may be brought into bearing contact with the successive top sheets of the pile p.

Each of the hold-down devices h and k are partially counter-balanced by means of the springs 147 which may be secured to portions of the framework G as at 148 and the other ends of which are connected as by means of the strands 149 and 149' with one side of the respective ends of the hold-down members h and k. The strands 149 and 149' may pass around guide pulleys 150 if necessary.

Means are provided for automatically raising and lowering the hold-down devices h and k as they are alternately employed in connection with the piling of the sheets upon the respective stacking areas. It will be understood that this lifting means is actuated in accordance with the timed or sequential operation of the machine and only the mechanical elements of the lifting means will be described at this point. Appropriately secured for pivotal movement upon the framework G are the fluid pressure cylinders 152 and 153. For example, the former may be pivoted as at 154 to a frame member 155 while the upper cylinder 153 may be pivoted as at 156 to this member. Pistons work in the cylinders 152 and 153 and are respectively operatively connected as by means of the rods 157 and 158 to the frames 145 and 145' of the respective hold-down devices h and k. Upon the outside surface of one of the side frame members 145 and 145' of the hold-down devices, there are provided outwardly projecting lugs 165 having vertical openings therein somewhat larger than the rods 157 and 158. The rods pass through these openings and are provided upon their lower ends with stop enlargements which may take the form of the nuts 166 shown in the illustrated embodiment. Thus a lost motion connection is provided which permits the bearer or hold-down assembly 140 and 140' to rise gradually as the piles of sheets are increased, without disturbing the rods 157 and 158. Then, when the piles have been completed, and the lifting means actuated, the latter will pick up the appropriate bearer assembly from the point to which it has risen, and move it to its upper limit.

As previously indicated, the weights of the hold-down devices are only partly counter-balanced by the springs 147 and thus the pistons within the cylinders 152 and 153 are continually urged downwardly. Fluid pressure for raising the pistons and thus the connected hold-down devices is admitted to the cylinders through the conduits 159 and 160. Valves 161 and 162 are interposed in these fluid pressure leads and the valves are respectively actuated by means of the solenoids 163 and 164.

It will be noted that the lifting or raising devices and the counter-balancing springs are operatively connected to only one side of each of the hold-down or bearer devices $h$ and $k$, and in order to prevent warping or twisting of the structure and an uneven pressure upon the piles, the framework is made exceptionally rigid. This is effected by the use of rigid torque sustaining rock shafts at 92 and 104 and the connecting of the side bars 145 and 145' of the bearer devices to the rock shaft rigidly by means of the splines 149, all as previously described.

The tapes of the hold-down devices $h$ and $k$ are driven by driving means which will be described in connection with the description of the propulsion of the conveyor devices. It will be realized that the bearing pressure of these devices upon the successive top sheets of the pile will probably confine the movement of these sheets and also urge the sheets forwardly to their final position up against the stop device $g$.

Discard handling

Occasionally during the piling of articles as received from the fabricating machine or the severing shear blades, defective articles will be encountered. For example, in the art of manufacturing corrugated board there will occasionally appear what are known as "loose-backs," and it is desirable that such defective articles should be diverted from the paths toward the piling zone C. As already indicated, this is the purpose and function of the discard conveyor system E which comprises the tape conveyors $l$ and $n$ and the table F. The general arrangement and configuration of this discard conveyor system are clearly shown in Figure 1 of the drawings where it will be perceived that the conveyor $l$ extends from a point adjacent the intake of the upper piling area $j$, forwardly to the point $m$ where the discards may be dropped upon the conveyor $n$ and thence transmitted to the point $r$ to the table F.

The manner and means of transferring sheets to this conveyor will be best understood from an inspection of Figures 4, 5, and 7 of the drawings. The tapes $l$, comprising the earlier stage of the discard conveyor system E, pass around the idle roller 170 and thence to the driven roller 171 at the forward end of the conveyor. The latter roller is disposed in close proximity to the pivotal mounting of the upper hold-down device $k$ adjacent the roller 142', and is adapted to receive sheets from between the conveyors $d$ and $e$ when these conveyors are raised from the normal position shown in Figures 4 and 7 to an upper position from which the sheets $s$ may be discharged from the conveyors $d$ and $e$ upon the upper run of the tapes $l$ of the discard conveyor as best shown in Figure 4 of the drawings. The rods or struts 45 of the lower conveyor $d$ are secured at their ends to the lower end of the coil spring 175, the upper end of which is secured to the bracket 176 attached to the upper part of the framework G. This spring 175 serves to substantially counterbalance the weight of the conveyors $d$ and $e$.

For raising and lowering the conveyors so as to alternatively discharge the sheets to the stacking area $j$ or the discard conveyor $l$, the remote end of the rod or bracket 45 of the conveyor $d$ is pivotally secured to the lower end of the links 177 the upper ends of which are pivoted to the crank arms 178 which are rigidly carried by the cross shaft 179 pivotally mounted on brackets secured to the upper channel frame member 180. At the operator's side of the machine there is secured upon the cross shaft 179 the crank arm 182. To the end of this crank arm there is pivotally secured one end of the piston rod 183 which at its other end carries a piston disposed for reciprocation within the fluid pressure cylinder 184, this cylinder being pivotally secured as at 185 to a bracket 186 carried by the frame member 180. Fluid pressure may be admitted to the respective ends of the cylinder 184 to raise and lower the conveyor $d$, $e$, by means of the pipe connections 187 and 188 which lead from the control valve 189 which may be manipulated by the handle 190 whenever the operator finds it necessary to shift the conveyor $d$, $e$ from the normal position for delivering sheets to the upper stacking $j$, to the upper discard position in association with the conveyor $l$.

The initial portion $l$ of the discard conveyor system E is driven by the motor 195 carried by suitable brackets carried upon the main frame G. The pulley 196 of the motor is operatively connected with the sheave or pulley 197 by means of the belts 198. The pulley 197 is carried by the drive shaft 199 which is mounted in suitable bearings and extends across the frame and carries the rollers 200 which serve to support the tapes or belts $l$ of the conveyor system E. The operation of the motor 195 is controlled by means which will be described, said means being responsive to the shifting of the conveyors $d$, $e$ to and from discard position.

Pile delivery

As previously indicated, and as will be best perceived from an inspection of Figures 2, 9, 10, and 12, the initial delivery conveyor system designated D is associated with the stacking zone C of the unit I and is adapted to receive piles alternating from the areas $f$ and $j$ and discharge them at a convenient level for removal by an operator, regardless of the height of the stacking areas. A bench frame $u$ supported by the legs or pedestals $x$ extends laterally outwardly from the main framework G upon the delivery or operating side of the machine and this supplemental framework $u$, $x$ serves to rigidly support the lower delivery conveyor member $t$. At the outer end of the bench $u$ there is adjustably supported a roller 204 which carries the conveyor tapes 205 which are also trained around the end roller 80 of the piling area f and receive their movement therefrom. In order to properly support the tapes 205 and prevent undue sagging, each tape is underlaid by the inverted channel elements 206 which are secured at their inner ends as at 207 to a bracket carried by the main frame; and these elements are suitably secured at their outer ends to the extension of the bench u.

From the upper stacking level j a conveyor t' extends outwardly and comprises the framing 208 which is suitably pivoted as at 209 to the main frame. This framing carries in its outer end the roller 210 around which the tapes 205 are trained, the inner portion of these tapes being passed around the end one of the rollers 80 and receive their driving force therefrom. This upper discharge conveyor t' is pivotally mounted and is provided with balancing means whereby when no piles are resting thereupon, the conveyor t' will be maintained in its upper position shown in solid lines in Figure 10, while upon receiving a pile from the upper level j the counter-balancing arrangement is overbalanced and the conveyor t' moved downwardly to the position shown in dotted lines, wherein the discharge end is disposed at substantially the level of the lower conveyor t. This counter-balancing means comprises a torque sustaining rock shaft 212 rotatably mounted in brackets 213 carried by the posts or legs x of the bench or extension frame u. Crank arms 215 are rigidly fixed upon each end of the shaft 212 as by means of the splines 214 and these crank arms are connected by means of the links 216 with the points 217 on the framing at the respective sides of the conveyor t'. Upon an intermediate portion of the rock shaft 212 there is fixed the crank arm 218 upon which is carried a counterweight 220 which may be adjustable along the arm.

It will be readily seen that if the sheets forming the piles are of a length shorter than the maximum available length of the stacking area, the weight of the delivered pile will be sustained mainly by the side of the delivery conveyor member next to the initial or receiving end of the machine, that is upon the left hand side of the conveyor as viewed in Figure 12. This uneven loading of the delivery conveyor might warp the device if it were not for the above provisions. As described, the torque sustaining rock shaft 212 is of a rigid construction and the crank arms 215 are splined as at 214 to the shaft and connected without any lost motion to the conveyor frame.

In Figures 13 and 14 a modified construction of the delivery unit D is shown in which the upper delivery conveyor t' is counter-balanced by a spring means rather than by means of a counterweight. All of the principal elements of the construction shown in these figures are the same as those shown in Figures 10 and 12 and are designated by the same reference characters. However, the cross shaft 212 carried in the brackets 213 supported upon the legs x of the bench or subframe u, has fixed thereon adjacent one side of the frame u, a crank arm 218', which extends in a generally upward direction and has attached at its upper end one end of the coil spring 220'. The remote end of the spring is secured as at 219 to a part of the frame u. The strength of the spring 220' is selected so as to somewhat more than counter-balance the upper conveyor t' when it is empty, but to permit the conveyor to descend as soon as a pile has been moved onto it from the upper stacking area j.

*Driving transmission for distributing conveyors*

As already indicated, the stacking area rollers, and the discard conveyor system E are driven by individual electric motors 85, 85', and 195 (See Figure 10) and the rollers and tapes of the delivery conveyors t and t' are driven from one of the rollers 80, 80' of the stacking area which it serves. On the other hand, the tape conveyors and distributors by means of which the sheets are carried to the stacking areas, and the hold-down devices which cooperate with the stop member in stacking the sheets, are all driven, in the preferred embodiment, from the shear or fabricating machine which the stacker serves. The tapes of the conveyor a, as has been previously stated, are driven from the shear A or from the fabricating machine, these tapes being trained around the roller 33 which is fixed to the shaft 37. This shaft 37 may be conveniently taken as a driving shaft for certain of the conveyors in its vicinity.

This particular driving arrangement will be clearly understood from an inspection of the left-hand portion of Figure 4 and the right-hand side of Figure 8, as well as Figure 3 in which the projecting parts of the drive shafts and the sheaves carried thereby are clearly shown. The shaft 37 which carries the conveyor roller 33 carries upon its outer projecting end a pulley or sheave 225. The shaft 44 which carries the roller 43 about which the lead end of the conveyor tapes of the conveyor c are trained has a projecting end upon which is fixed a pulley or sheave 226. Similarly the shaft 51 upon which the roller of conveyor d is fixed, carries a pulley or sheave 227. The roller 50 at the receiving end of the hold-down conveyor e, is mounted on the shaft 51' which carries at its end a sheave 228. The shaft 39 which carries the pulley 38 which comprises a part of the delivery end of the hold-down conveyor b, is also provided with a sheave or pulley 229. Also upon a cross member 230 extending between the posts 29 and 30 there is mounted a shaft 232 which carries an idler pulley 233. All of these pulleys 225, 226, 227, 228, 229, and 233 are preferably provided with multiple grooves and carry a series of V-belts 35 by means of which the drive is transmitted from the pulley 225 on the drive shaft 37 to the shafts which carry the tapes of the conveyors b, c, d, and e.

Similar driving means is provided for the rollers and hold-down device provided adjacent the piling areas. The remote or delivery end of the conveyor a includes the roller 22 about which the tapes are passed, which roller is fixed to a transverse shaft 23 carried in brackets 24 secured in posts 25 of the framework. The shaft 23 projects beyond the frame and is provided with a pulley or sheave 233. The shaft 144 upon which the roller 142 of the lower hold-down device is fixed, carries a sheave 239 upon its projecting end, and the shaft 101 which carries the delivery roller 100 adjacent the upper piling area j is provided with a sheave 240. It will be recalled that the upper roller 142' of the hold-down device k is mounted upon a shaft 144' and this shaft also is provided at its projecting end with a sheave 242. Upon the upper channel frame member 180 forming a part of the framework G there is provided an axle 244 upon which a sheave 245 is mounted and upon the horizontal frame element 27 and at an intermediate height of the framework there is mounted an axle 247 upon which is carried a sheave 248. Trained about the sheaves 238, 239, 240, 242, 245, and 248 are the drive belts 250, whereby power is transmitted from the shaft 23, driven by the conveyor a, to both of the hold-down devices h and k and to the delivery roller 101.

Second stacking unit

Most of the details of the stacking unit II are exactly the same as the corresponding elements of the unit I, particularly within the stacking zone C' which comprises the alternately usuable stacking areas j' and j'. However, the lead-in and distributing conveyors are somewhat differently arranged and constructed in order to provide the novel installation whereby the two units I and II are conveniently enclosed and supported within the same compact framework. The principal subdivisions of unit II have been set forth in a general way in reference to Figures 1 and 2 of the drawings, and the conveyors of unit II may be readily followed and traced across Figures 4, 5, and 8 of the drawings. The sheets s' as they are severed from the web w' by means of the shear A' pass between the tapes of the lower and upper conveyors a' and b'. The tapes a' upon entering the portion of the machine shown in Figure 4 pass over the roller 255 supported by the posts 30 and thence pass around the roller 256 supported by brackets 257 secured to the posts 25. The return run of the tapes a' passes around the staggered rollers 258, 259, secured by brackets upon opposite sides of the short posts 28, and return thence to the intake end of the conveyor.

The hold-down conveyor b' is pivotally mounted upon the shaft 260 which is supported by brackets secured to the posts 30, and a roller 261 on this shaft takes the tapes at the entrance end of the conveyor. Struts or bars 263 extend forwardly from the pivot shaft 260 and carry upon their forward ends the roller 264 upon which the tapes are trained.

Now resuming the description of the path of the sheets through unit II, it will be noted at the left hand end of Figure 5, that the sheets pass from the tapes of conveyors a' and b' almost immediately between the cooperating conveyors a2 and b2. At the intake end, the tapes of the conveyor a2 are trained around the roller 256 which also serves to support the discharge end of the conveyor a'. The tapes a2 cooperate with the tapes b2 of the upper conveyor to receive the sheets and transport them to the distributing or switching device B'. The tapes of the conveyor b2 pass around the roller 265 and the roller 266, the former being carried upon the fixed shaft 267 and the latter upon the end of the struts or rods 268 forming the framework of this hold-down conveyor. The cross shaft 267 is mounted in bearings suitably supported by portions of the framework G which may include the plate 270.

The tapes a2 pass around the supporting roller 271 and then in opposite directions around the rollers 272 and 273, these rollers being located adjacent the discharge end of the conveyor b2 and serving to guide the tape a2 around the switching or distributing blades of the distributing assembly B'. The tapes a2 then pass over the roller 275 and thence to the discharge end of the conveyor a2 which is indicated at 276 in Figure 1. The lower or return run of the conveyor tapes a2 pass beneath the roller 277 and above the roller 278 both carried by brackets supported upon the lower horizontal member 279 of the framework G.

The switching or distributing blades of the device B' are indicated at 52' and 53' and are actuated in the same way and by a similar mechanism to those associated with the blades 52 and 53 of the unit I. When the blades are in the lowermost position the sheets are directed to the throat of the conveyor system comprised by the second half of the conveyor a2 and the upper or hold-down conveyor b3. The conveyor b3, a part of which is shown at the right hand end of Figure 5 includes the struts or bars 280 and a roller 281 carried by the ends thereof, and it will be readily seen how the sheets pass between the tapes a2 and b3 and are carried toward the delivery point upon the lower stacking area f'.

When the distributor blades 52' and 53' are in the upper position shown in Figure 5 the sheets s' are directed between the lower conveyor d' and the upper conveyor e' from whence they are discharged upon the stacking area j'. Conveyor d' has its tapes pass around the roller 283 and a forward roller 284 which is shown in Figure 1 of the drawings. This conveyor is disposed in a relatively fixed or non-pivotal position. The cooperating hold-down conveyor e' has its tapes pass around a roller 285 at the discharge end, this roller being mounted upon a pivot shaft 286 carried by bracket 287 supported upon the post 130. Extending from the pivot shaft 286 are the struts or rods 288 which carry a roller 289 upon their ends. Thus it will be seen that the conveyor e' may be raised by a pivotal movement about the shaft 286 whenever it is necessary to separate the conveyors d' and e'.

An inspection of Figure 1 of the drawings will disclose that the sheets, in their upper path through the unit II pass from between the conveyors d' and e' into the control of the cooperating conveyors d2 and e2. These conveyors correspond in purpose and function to the conveyors d and e of unit I and are adapted to be raised from their normal position in which they deliver sheets to the stacking area j' to an upper discard position for delivering sheets upon the element n of the discard system E. To effect this purpose pneumatic lifting means indicated generally at 290 is employed. This pneumatic means corresponds exactly to the device described in connection with raising conveyors d and e, and embodying the air cylinder 184 (see Figure 4).

As previously indicated, the distribution of the sheets s' upon the stacking areas f' and j' is exactly the same as that described in connection with unit I of the device. The rollers of these stacking areas f' and j' are driven by motors controlled in the same way as in the first unit and they deliver the completed stacks or piles transversely onto the delivery installation D'. Due to the fact that the stacking areas f' and j' are displaced downwardly relatively to the stacking areas f and j of the first unit, the conveyors comprising the discharge system D' are inclined upwardly in the direction of the discharge as clearly shown in Figure 15 of the drawings. In this figure there is shown at 300 one of the vertical side posts of the framework G and extending from the framework G is a bench or subframe u which is supported at its outer end by the post x'. An upper horizontal brace is indicated at 301. The rollers 80 of the stacking area conveyor f' deliver the sheets upon the inclined discharge conveyor y the tapes 205 of which are trained around an end one of the rollers 80 and around the terminal roller 302 carried upon the end of the bench frame u'. The piles from the upper area j' are shifted transversely by the driven rollers 80' onto the upper conveyor z the tapes 205' of which are driven from the end one of the rollers 80'. The conveyor z is suitably pivoted from the frame in a manner similar to the pivoted conveyor t' of the delivery system D, the outer end of the conveyor being supported by means of cables 304 trained around pulleys 305 at the tops of the posts x' upon either side of the conveyor. To the opposite ends of the cables 304 are attached the counter-weights 306 which serve to slightly balance the weight of the conveyor z when empty. When piles of sheets are delivered upon the conveyor z the weight of the pile will move the conveyor downwardly against the influence of the weights 306 whereupon the conveyor will occupy the dotted line position shown in Figure 15 and the sheets will be delivered at substantially the same level as the delivery point of the roller conveyor y and of the delivery points of the conveyors t and t' of the system D of the first unit.

*Automatic and manual control*

The operation of the improved stacking machine will now be described, particularly in relation to Figure 16 of the drawings in which the principal operative parts of the device are shown diagrammatically together with the fluid pressure lines and the electrical wiring.

It will be helpful in understanding the details of the controls, if a brief description of the functions and operations of the alternately energized elements is given. Suitable counting devices preferably actuated by impulses derived from the passage of successive sheets toward the distributor B, totalize the sheets passing through the distributor when it is in one position and when a predetermined number of sheets have passed toward one stacking area, the counting device automatically shifts the distributor blades 52 and 53 of distributor device B to direct the sheets toward the other stacking area. At the same time the counting device begins counting the sheets passing to the second area.

The shifting of the distributor blades not only serves to direct the sheets toward the alternative area, but also prepares a circuit for energization to raise the hold-down members upon the opposite stacking area to an inoperative position. The completion of this circuit is accomplished by the dropping of the first sheet upon the new area. At the same time that this circuit is prepared for energization, the circuit which heretofore had held the hold-down devices in idle position within the area now to be used, is broken and the hold-down devices move downwardly to operative position upon the pile being formed.

The effect of the lifting of either one of the hold-down devices to the upper idle position is to close an electrical circuit energizing the roller-driving motor of the stacking area upon which a pile has just been completed, and thus move the pile transversely of the machine toward one of the delivery installations. Conversely, while stacking is proceeding upon a stacking area the hold-down devices are depressed and the motor energizing circuit is open.

A further circuit is provided for energizing the discard conveyor motor whenever the manually controlled pneumatically operated lifting devices for the conveyors d, e are actuated toward discarding position. The raising of the conveyors d, e to discarding position also has the effect of interrupting the impulse generating circuit so that the passage of successive sheets will not actuate the counting devices so long as the conveyors are held in discarding position.

There will now be described the electrical circuits and mechanical devices involved in the shifting of the distributor B. The sheet counting and distributor control circuit may be designated in its entirety by the reference letter P and the circuit which energizes the impulse generating device may be designated R. In the preferred form of the invention this device comprises an electric eye arrangement whereby a lamp directs a beam across the path of the sheets toward a photoelectric cell and the successive interruptions of the beam by the passage of the sheets causes impulses to be generated in the latter member.

In circuit P the leads from the source of current are designated L' and L2. Two electrically actuated counting mechanisms are provided and are indicated by the legends "Counter No. 1" and "Counter No. 2" in Figure 16. These counters are of the type designated "Microflex Instantaneous Reset Counter" illustrated and described in Booklet 297 of the Eagle Signal Corp. of Moline, Illinois. Counter No. 2 is shown partly in elevation, exhibiting a setting dial 400 by which the number of sheets to be allotted to each pile is predetermined. Counter No. 1 is shown in diagrammatic form with the internal electrical circuits disclosed. Both counters are exactly alike and a description of one will suffice. The reference numeral 401 indicates a clutch coil and a count coil is shown at 402. A switch associated with the clutch coil is indicated at 403 and another switch adapted to be actuated by the clutch coil is shown at 404. The counting devices are generally provided with two switches similar in purpose and construction to the one indicated at 404 and this is shown at 405 but is not used in the present hookup.

A series of terminals are provided on each counter and are designated by the following reference numerals: 410, 411, 412, 413, 414, 415, and 416. It will be seen that the clutch coil 401 bridges the contacts 410 and 412; the count coil 402 bridges the contacts 410 and 414; the switch 403 is disposed across the terminals 411 and 413; the terminals 413 and 414 are bridged by a connection within the counter; and switch 404 is disposed across the terminals 415 and 416. The wires L' and L2 from the source of current are connected into the devices as follows: the line L' is connected with the terminals 410 of both counters; and line L2 is connected with the terminals 415 of both counters.

A lamp which casts a beam across the path of the sheets immediately in advance of the distributor B is indicated at 420, the beam being directed toward the photoelectric cell 421 which may be contained within a suitable casing 422. Lines L' and L2 from the source of current are connected to the binding posts 424 of the casing 422 and a pair of binding posts 425 are also connected within the casing across the current lines from L' and L2 and provide a source of current for the lamp 420. A wire 426 connects one of the binding posts with the lamp; another wire 427 is connected with a mercoid switch 428; and the other terminal of the mercoid switch is connected by means of the wire 429 to the other lamp terminal. The mercoid switch 428 is pivotally connected as at 430 with a portion of the framework G, and the switch is connected at its other end by means of a link 432 with the tiltable discard conveyor assembly d, e. Thus, it will be seen that when the conveyor d, e is in the lower normal position delivering sheets to the stacking areas j, the mercoid switch contact is closed and the lamp 420 energized, in which condition the count may proceed by the interruption of the beam by the passage of the sheets from conveyors a, b to the distributor B. On the other hand, when the conveyor d, e is raised to discard position by means of the fluid pressure device controlled by the hand valve 189, 190, the mercoid switch is tilted, the circuit R broken and the lamp de-energized thus interrupting the count.

The photoelectric cell 421 is connected with the source of current from the leads L' and L2 by suitable arrangement within the casing 422 so that each impulse received thereby will energize a relay coil 435 and this coil will actuate the switch 436, this switch being connected within the casing 422 across the terminals 437 and 438. A wire 439 connects the terminal 437 with the line L2 while a wire 440 connects the terminal 438 with the terminals 411 of both counters.

There is indicated at 445 a relay device which may be a Struthers Dunn relay which is adapted to alternately open and close each one of a pair of switches upon successive energizations of the relay magnet. The magnet is indicated at 446 and is connected across the binding posts 447 and 448. One of the alternate switches of the relay is indicated at 450 and the other at 451. A common lead 452 connects one side of each switch with the terminals 415 of the counters which are in turn connected with the line wire L2. A lead 454 connects the other side of switch 450 with a wire 455 leading from the terminal 412 of counter No. 1 and both of these wires are connected by means of the wire 456 with one terminal of the solenoid 71 which actuates the valve 64 which controls the air cylinder 61 so as to move the distributor blades 52, 53 of the distributor B downwardly.

The opposite terminal of switch 451 of the relay is connected by means of the wire 458 to the terminal 412 of counter No. 2 and to one post of the solenoid 70 which actuates the pneumatic mechanism to raise the blades 52, 53 of the distributor B. A return wire 460 connects the other two terminals of the solenoids 70 and 71 with the lead wire L'.

The terminal 447 of the relay coil 446 is connected with a portion of the line circuit L', conveniently the part which bridges across the terminals 410 of the two counters. The terminal 448 of the relay coil is connected with the terminals 416 of both counters by means of the wire 462.

A manually operable switch 465 is disposed adjacent the counter and relay installation and is connected across the terminals 415 and 416 of counter No. 1, the lead from the switch to terminal 415 being connected with the common return wire 452 of the alternate relay switches.

The counters illustrated herein are of the well-known type referred to in which the count coil is energized by received impulses to step a movable member, for example a ratchet wheel, around for a certain predetermined number of increments, whereupon the counting mechanism will release the clutch coil and momentarily close the switch 404. Assuming the switch 403 of counter No. 1 to be closed, the clutch circuit may be traced as follows: line L', terminal 410 of counter No. 1, clutch coil 401, terminal 412, wire 455, wire 454, relay switch 450, wire 452, terminal 415 of counter No. 1, lead wire L2.

The clutch switch 403 of counter No. 1 is maintained closed by the clutch coil, and the impulses from the photoelectric cell due to the passage of successive sheets, actuates the counter coil through the following circuit: line circuit L2, wire 439, terminal 437, impulse switch 436, terminal 438, wire 440, terminal 411 of counter No. 1, switch 403 of the same counter, terminal 413, terminal 414 by way of the internal cross connection, count coil 402, terminal 410, line wire L'.

When successive impulses have stepped the counter around until the clutch is released at the end of the predetermined count, switch No. 404 of counter No. 1 is momentarily closed. This causes current to flow through the following circuit: line L2, terminal 415, switch 404 of counter No. 1, terminal 416 of counter No. 1, terminal 448 of the relay coil, relay coil 446, terminal 447, line wire L'. The energization of relay coil 446, thus effected, serves to open switch 450 and close switch 451. The effect of this switchover is to de-energize the line leading to solenoid 71 and to energize the following circuit: line wire L2, terminal 415 of counter No. 1, wire 452, switch 451, wire 458, solenoid 70, return lead 460, line wire L'. This serves to energize solenoid 70, and actuate the valve 64 to raise the blades 52, 53 of the distributor B to the position where they will discharge sheets into conveyors d, e and thence to stacking area j. When switch 450 was interrupted the circuit through the solenoid 71 was also broken and that solenoid de-energized. At the same time that switch 451 is closed the following circuit is energized shifting the count to counter No. 2: line L2, terminal 415 of counter No. 1, wire 452, switch 451, wire 458, terminal 412 of counter No. 2, clutch coil 401 of counter No. 2, terminal 410, line wire L'. This energization of clutch 401 of counter No. 2 sets that counter into operation and impulses from sheets being fed to the distributors B in upper position are impressed upon counter No. 2 in the same way as described in connection with the operation of counter No. 1. At the end of the count, switch 404 of counter No. 2 is momentarily energized and the relay 445 is reversed and distributor solenoid 71 re-energized as solenoid 70 is thrown out of operation.

Once the distribution of sheets has been shifted from one area to the other, the hold-down arrangements h and k must be shifted over so as to free the completed pile and to bring the appropriate hold-down into operation upon the pile about to be built up. This shiftover is accomplished by the following means. When the blades 52 and 53 of distributor B are moved to upper position by the raising of the piston rod 60 and the depending connection 58, the contact arm 72 opens the limit switch 75 and energizes the limit switch 74. This de-energizes circuit S' and energizes circuit S. Circuit S includes the following elements. Beginning with the leads from the source of current indicated at 470, a wire 471 makes connection with the limit switch 74 and from this switch a wire 472 leads to one terminal of the sheet actuated switch 95' associated with the upper stacking area j. A wire 474 connects the other terminal of the switch 95' with a terminal of the solenoid 163 which controls the valve 161 to admit pressure fluid through the connetcion 159 to the power cylinder 152 which raises the piston rod 157 and thus lifts the lower hold-down device 140 from contact with the pile on stacking area *f*. A return lead 475 connects the solenoid 163 with the source of current. It will thus be seen that when the switch or distributing device B is raised to upper position, the circuit S is prepared for actuation by the closing of the limit switch 74. As the sheets proceed through the conveyors *d, e* and the first one drops upon the stacking area *j* and contacts the finger 96', the switch 95' is also closed thus energizing the solenoid 163 and lifting the hold-down device *h* from the completed pile on area *f*.

Circuit S' may be traced as follows from the leads 477 from a suitable source of current. A wire 478 connects with the lower limit switch 75 and a wire 479 leads from this switch to the sheet actuated switch 95 of lower area *f*. A wire 480 leads to solenoid 164 which controls the lifting cylinder 153 which is adapted to raise the hold-down *k* from the upper area *j*. A return lead wire 481 connects with the source of current.

A switch 485 is disposed above a rigid portion of the hold-down device *h* so as to be contacted thereby when the latter is in its uppermost position. This switch is connected by the circuit T with the controller box 488 which energizes the motor 85 which drives the rollers 80 of the conveyor which comprises the lower stacking area *f*. Similarly a switch 490 is disposed so as to be closed by contact with the upper hold-down device *k* when in its uppermost position, this switch 490 being connected by the circuit T' with the controller box 492 for the motor 85' which drives the rollers 80' of upper stacking area *j*. It will thus be seen that when a pile is completed upon the lower area *f* and the upper limit switch 74 is closed by the arm 72 and the first sheet faces upon the stacking area *j* the hold-down *h* will be closed, motor 85 will be energized, and rollers 80 will be driven to carry the pile *p* off area *f* to the delivery mechanism. When the pile commences to form upon the upper area *j* the holddown *k* is lowered onto the top of the pile and the switch 490 is open thus breaking the circuit T' and de-energizing the motors 85' and thus stopping the conveyor rolls 80'. This of course occurs immediately the limit switch 75 is open and the rollers are thus stopped before any sheet reaches the stacking area. Similarly the carryoff rollers of the other stacking area are not energized until both a limit switch (74 or 75) and a sheet actuated switch (95 or 95') are closed.

The effect of the actuation of the discard devices will now be described. When the handle 190 is thrown in a direction to open valve 189 to admit pressure fluid through the pipe 188 from the pressure fluid main Z, to the cylinder 184 the bell crank arrangement 178, 182 is rocked thus lifting the conveyors *d, e* through the link 177 to discard sheets upon the conveyor belt *l*. When the crank arm 182 is rocked in a counterclockwise direction as viewed in Figure 16, an abutment 500 closes a switch 501 which closes the circuit Y actuating the control box 503 of the motor 195 which drives the discard conveyor *l*. Thus, the defective sheets or "loose-backs" discharged by the conveyors *d, e* upon the belt *l* of the discard system E are carried off as the latter belt begins to move. At the same time the lifting of the conveyor *d, e* tilts the mercoid switch 428, breaking the lamp energizing circuit R and extinguishing the lamp 420 whereupon the defective sheet passing from the conveyors *a, b* is not counted since no impulse will pass from the electric eye 421 to the counting devices.

If the discard device is actuated while the sheets are being fed through the blades 452 and 453 in lower position toward the stacking area *f*, the operator, at the same time that he actuates the discard conveyor controlling handle 190, must actuate switch 465 adjacent the relay 445. This short circuits the terminals 415 and 416 and has the same effect as the momentary energizing of the switch 404 of counter No. 1, namely, that of discontinuing the count and shifting the operation control over to the other counter. This will mean that the blades 52, 53 will be raised to discharge the sheets onto the conveyors *d, e* and these conveyors will at the same time be raised to discard the sheets upon the discard conveyor *l*. This will mean that the count on the lower area *f* will be incomplete, but this may be taken into account when the pile is moved off the area along the discharge conveyor system D.

On the other hand, if the pile is being formed upon the upper level *j* when a "loose-back" or other defective sheet is spotted, the operator need only manipulate the handle 190 of the discard conveyor shifter and need not actuate the switch 465, since the sheets are already being directed to the pivoted conveyors *d, e*. In this case the count is not terminated but only suspended pending the shifting of the conveyors and the mercoid switch 428 back to normal position, and the pile being formed on the upper level *j* will be deficient by the exact number of sheets discarded.

Various changes and modifications may be made in the embodiments illustrated and described herein without departing from the scope of the invention as described by the following claims.

Having thus described the invention, what is claimed as new and desired to be secured by Letters Patent is:

1. A sheet stacking machine of the class described comprising, in combination, a forked conveyor system for supplying sheets alternately to two superposed stacking areas, said system comprising a relatively fixed receiving conveyor portion, and two superposed branch conveyors extending from said receiving portion, the lower branch conveyor adapted to deliver successive sheets upon the lower stacking area, and the other branch conveyor adapted normally to deliver sheets to the upper stacking area, and a sheet diverter for deflecting sheets to one or the other of said branches at the fork in said conveyor system, a third receiving area for sheets above the upper stacking area, means for pivotally mounting the upper one of said branch conveyors, and means for raising the delivery end of said branch so as to deliver sheets normally destined for said upper stacking area to said third area.

2. A sheet stacking machine of the class described comprising, in combination, a forked conveyor system for supplying sheets alternately to two superposed stacking areas, said system comprising a relatively fixed receiving conveyor portion, and two superposed branch conveyors extending from said receiving portion, the lower branch conveyor adapted to deliver successive sheets upon the lower stacking area, and the other branch conveyor adapted normally to deliver sheets to the upper stacking area, and a sheet diverter for deflecting sheets to one or the other of said branches at the fork in said conveyor system, a third receiving area for sheets above the upper stacking area, means for pivotally mounting the upper one of said branch conveyors, and means for raising the delivery end of said branch so as to deliver sheets normally destined for said upper stacking area to said third area, and automatically operated means dependent upon the number of sheets to comprise a stack on said alternately usable stacking areas for actuating said diverter, and manually actuated means for moving said pivoted branch conveyor to and from positions for diverting a sheet to said third area.

3. In a machine of the class described, a branched conveyor system comprising an endless belt conveyor member having a roller supported upper article carrying run and a lower return run, a cooperating endless belt hold-down member bearing upon the upper run of said conveyor member for the initial portion thereof, a second endless belt hold-down member bearing upon a final portion of said first named conveyor member, said hold-down conveyor members cooperating with said conveyor member to confine and guide sheets therealong, said hold-down members being spaced apart at an intermediate point for a distance somewhat less than the minimum length of sheets to be handled by the machine, a second endless belt conveyor member disposed with its receiving end adjacent the space between the said hold-down members and above the first named conveyor member, said second endless belt conveyor member diverging from said final portion of said first named conveyor member, a third endless belt hold-down member cooperating with said second endless belt conveyor member, and a sheet diverting member disposed adjacent said space, and means for shifting said diverting member to direct sheets either between the final portion of said first endless belt conveyor and the cooperating second endless belt hold-down member or between the second endless belt conveyor and the cooperating third hold-down member.

4. In a sheet stacking machine of the class described, the conveyor system as set forth in claim 3, in which one of the rollers supporting said first named endless belt conveyor is extended laterally beyond the belts thereon and carries a pulley; means are provided for driving said first named conveyor; pulleys are respectively provided upon the ends of at least one of the rollers supporting said initial hold-down endless belt conveying member, said final hold-down endless belt conveyor member, said second endless belt conveyor and its hold-down member; and driving belts are provided connecting all of said pulleys for transmitting power from said first named conveyor to the other conveyors and hold-down members.

5. In a machine of the class described, a branched conveyor system comprising an endless belt conveyor member having a roller supported upper article carrying run and a lower return run, a cooperating endless belt hold-down member bearing upon the upper run of said conveyor member for the initial portion thereof, a second endless belt hold-down member bearing upon a final portion of said first named conveyor member, said hold-down conveyor member cooperating with said conveyor member to confine and guide sheets therealong, said hold-down members being spaced apart at an intermediate point for a distance somewhat less than the minimum length of sheets to be handled by the machine, a second endless belt conveyor member disposed with its receiving end adjacent the space between the said hold-down members and above the first named conveyor member, said second endless belt conveyor member diverging from said final portion of said first named conveyor member, a third endless belt hold-down member cooperating with said second endless belt conveyor member, and a sheet diverting member disposed adjacent said space, means for shifting said diverting member to direct sheets either between the final portion of said first endless belt conveyor and the cooperating second endless belt hold-down member or between the second endless belt conveyor and the cooperating third hold-down member, and means for swinging said second endless belt conveyor together with said third hold-down member about its receiving end to vary its discharge point.

6. In a sheet stacking machine of the class described, a supporting framework, a stacking area thereon, a displaceable distributing conveyor for normally delivering sheets serially to said stacking area, automatically operated means for counting the sheets delivered to said area, means for shifting said conveyor to a position to discard a sheet, said shifting means comprising a fluid pressure cylinder supported upon the framework, a piston therein, a piston rod and linkage connected to said conveyor, a manually operated admission and exhaust valve for said cylinder whereby said conveyor may be shifted to and from discard position at will, a switch adapted to be actuated automatically to suspend the operation of the counting means when the conveyor is in discarding position.

7. In a sheet stacking machine of the class described, a supporting framework, a stacking area thereon, a displaceable distributing conveyor for normally delivering sheets serially to said stacking area, automatically operated electrical means for counting the sheets delivered to said area, means for energizing said counting means by the passage of successive sheets toward said stacking area, said conveyor being pivoted at its receiving end to said framework, means for shifting said conveyor to a position to discard a sheet, said shifting means comprising a fluid pressure cylinder pivotally supported at one end on the framework, a piston therein, a piston rod and linkage connected to said conveyor at a point remote from the pivot point of the latter, a manually operated admission and exhaust valve for said cylinder whereby said conveyor may be shifted to and from discard position at will, a switch on said conveyor adapted to be actuated automatically to suspend the operation of the counting means when the conveyor is in discarding position.

8. In a sheet stacking machine of the class described, a supporting framework, a stacking area thereon, a displaceable distributing conveyor for normally delivering sheets serially to said stacking area, automatically operated electrical means for counting the sheets delivered to said area, means for energizing said counting means by the passage of successive sheets toward said stacking area, said conveyor being pivoted at its receiving end to said framework, means for shifting said conveyor to a position to discard a sheet, said shifting means comprising a fluid pressure cylinder pivotally supported at one end on the framework, a piston therein, a piston rod and linkage connected to said conveyor at a point remote from the pivot point of the latter, counter-balancing means for said conveyor, a manually operated admission and exhaust valve for said cylinder whereby said conveyor may be shifted to and from discard position at will, a gravity actuated switch on said conveyor adapted to be actuated automatically to suspend the operation of the counting means when the conveyor is in discarding position.

9. In a stacking machine for sheets, in combination, a supporting framework, alternately usable vertically spaced stacking areas thereon, means for feeding sheets in superposed relationship in alternation to said areas to form piles thereon, each of said stacking areas comprising a conveyor, means for driving said conveyor to deliver piles transversely from said machine, and means for automatically operating said driving means in alternation, whereby completed piles may be discharged from one stacking area while sheets are being stacked upon the other of said areas, a common stop device provided for predetermining the point on both areas at which the sheets being delivered to the piles thereon come to rest, and means for adjusting said device along said areas.

10. In a stacking machine for sheets, in combination, a supporting framework, alternately usable vertically spaced stacking areas thereon, means for feeding sheets in superposed relationship in alternation to said areas to form piles thereon, each of said stacking areas comprising a conveyor, means for driving said conveyor to deliver piles transversely from said machine, and means for automatically operating said driving means in alternation, whereby completed piles may be discharged from one stacking area while sheets are being stacked upon the other of said areas, a common stop device provided for predetermining the point on both areas at which the sheets being delivered to the piles thereon come to rest, and means for adjusting said device along said areas, said stop device comprising a carriage supported for longitudinal movement upon said framework and having stop boards extending therefrom across said areas, a rack on said framework, a rotatable shaft on said carriage, a pinion fixed on said shaft, a sprocket wheel fixed on said shaft, a chain trained about end sprockets supported at fixed points beyond the travel of said carriage upon said framework in both directions, and driving means for rotating one of said last named sprockets and thus causing said chain to move the carriage.

11. In a stacking machine for sheets, in combination, a supporting framework, alternately usable vertically spaced stacking areas thereon, means for feeding sheets in superposed relationship in alternation to said areas to form piles thereon, each of said stacking areas comprising a conveyor, means for driving said conveyor to deliver piles transversely from said machine, and means for automatically operating said driving means in alternation, whereby completed piles may be discharged from one stacking area while sheets are being stacked upon the other of said areas, a common stop device provided for predetermining the point on both areas at which the sheets being delivered to the piles thereon come to rest, and means for adjusting said device along said areas, said stop device comprising a wheeled carriage supported for longitudinal movement upon the upper portion of said framework and having depending stop boards extending therefrom across said areas, a rack on said framework, a rotatable shaft on said carriage, a pinion fixed on said shaft, a sprocket wheel fixed on said shaft, an endless chain trained about end sprockets supported at fixed points beyond the travel of said carriage upon said framework in both directions, and manually operated means for rotating one of said last named sprockets and thus causing said chain to move the carriage.

12. In a stacking machine for sheets, in combination, a supporting framework, alternately usable vertically spaced stacking areas thereon, means for feeding sheets in superposed relationship in alternation to said areas to form piles thereon, each of said stacking areas comprising a roller conveyor, the axes of the rollers of which are parallel with the direction of receipt of sheets thereon, means for driving said rollers to deliver piles transversely from said machine, means for automatically operating said driving means in alternation, whereby completed piles may be discharged from one stacking area while sheets are being stacked upon the other of said areas, and delivery belt conveyor members disposed laterally of each of said areas for receiving piles therefrom, the belts of the delivery conveyor being trained about the end roller of the roller conveyors comprising the stacking areas, to receive driving force therefrom.

13. In a sheet stacking machine of the class described, in combination, a stacking area, a delivery conveyor member serving said stacking area and adapted to deliver piles therefrom to a vertically fixed delivery point, means for pivotally mounting the receiving end of said delivery conveyor member closely adjacent the edge of said stacking area, means for movably supporting the discharge end of said delivery conveyor, counter-balancing means, means for connecting said counter-balancing means to said discharge end of the conveyor, the force exerted by the counter-balancing means being such that when unloaded, the counter-balancing means overbalances the conveyor and maintains it in an elevated position, but is insufficient to counter-balance the weight of the conveyor together with the weight of a pile when received from said stacking area, whereby an oncoming pile causes the delivery conveyor to move downward to delivery position.

14. In a sheet stacking machine of the class described, in combination, a stacking area, a delivery conveyor member serving said stacking area and adapted to deliver piles therefrom to a vertically fixed delivery point, means for pivotally mounting the receiving end of said delivery conveyor member closely adjacent the edge of said stacking area, means for movably supporting the discharge end of said delivery conveyor, counter-balancing means comprising a counterweight, means for connecting said counterweight to said discharge end of the conveyor, the force exerted by the counterweight being such that when unloaded, the counterweight overbalances the conveyor and maintains it in an elevated position, but is insufficient to counter-balance the weight of the conveyor together with the weight of a pile when received from said stacking area, whereby an oncoming pile causes the delivery conveyor to move downward to delivery position.

15. In a sheet stacking machine of the class described, in combination, a stacking area, a delivery conveyor member serving said stacking area and adapted to deliver piles therefrom to a vertically fixed delivery point, means for pivotally mounting the receiving end of said delivery conveyor member closely adjacent the edge of said stacking area, means for movably supporting the discharge end of said delivery conveyor, counter-balancing means comprising a tension spring, means for connecting said spring to said discharge end of the conveyor, the force exerted by the spring being such that when unloaded, the spring overbalances the conveyor and maintains it in an elevated position, but is insufficient to counterbalance the weight of the conveyor together with the weight of a pile when received from said stacking area, whereby an oncoming pile causes the delivery conveyor to move downward to delivery position.

16. In a sheet stacking machine, in combination, a plurality of alternately usable stacking areas, means for feeding a succession of sheets to said stacking areas in alternation to form piles thereon, each of said areas comprising a conveyor alternately actuatable to move the completed piles from the machine, said feeding means adapted to discharge the sheets onto the piles from a point laterally of said piles and a little above the same, bearer devices yieldably pressing on the top of the pile being formed and beneath which bearer devices the successive top sheets are fed, and automatically electrically actuated fluid pressure operated means for alternately raising said respective bearer devices from said piles to an upper idle position upon completion of a pile and during the time that the conveyor is operating to carry off the completed pile.

17. In a sheet stacking machine, in combination, a plurality of alternately usable stacking areas, means for feeding a succession of sheets to said stacking areas in alternation to form piles thereon, each of said areas comprising a conveyor alternately actuatable to move the completed piles from the machine, said feeding means adapted to discharge the sheets onto the piles from a point laterally of said piles and a little above the same, bearer devices yieldably pressing on the top of the pile being formed and beneath which bearer device the successive top sheets are fed, automatically electrically actuated fluid pressure operated means for alternately raising said respective bearer devices from said piles to an upper idle position upon completion of a pile, and means actuated by said bearer devices upon reaching their respective upper idle positions to start the conveyor which comprises the stacking area which said bearer device serves.

18. In a sheet stacking machine of the class described, in combination, a supporting framework, a stacking surface consisting of a horizontally disposed roller conveyor on said framework, an electric motor for driving said conveyor, means for feeding a succession of sheets to said surface to form a pile thereon, an element adapted to bear upon the successive top sheets on said pile, means for moving said element to an upper idle position when the pile has reached a desired predetermined height, and a switch actuated by said element when it reaches its upper idle position to energize said motor to start the conveyor to move the pile toward a discharge point.

19. In a sheet stacking machine, in combination, a plurality of alternately usable stacking areas, means for feeding a succession of sheets to said stacking areas in alternation to form piles thereon, each of said areas comprising a conveyor alternately actuatable to move the completed piles from the machine, said feeding means adapted to discharge the sheets onto the piles from a point laterally of said piles and a little above the same, bearer devices yieldably pressing on the top of the pile being formed and beneath which bearer devices the successive top sheets are fed, means actuated by the shifting of said feeding means from one area to the other for raising the respective bearer devices from the pile to an upper idle position above the area from which the feeding means is being shifted, whereby the completed pile may be readily removed therefrom, and means actuated by said respective bearer devices when raised to idle position to actuate the conveyor which comprises the area which the respective device serves.

20. In a sheet stacking machine of the class described, in combination, a supporting framework, a plurality of alternately usable stacking areas thereon, means for feeding a succession of sheets to said stacking areas in alternation to form piles thereon, each of said areas comprising a conveyor alternately actuatable to move the completed piles from the machine, said feeding means including a sheet diverter element shiftable to and from positions to alternately deliver the sheets onto the respective piles from a point laterally of said piles and a little above the same, bearer devices yieldably pressing on the top of the pile being formed and beneath which bearer devices the successive top sheets are feeding, electrically actuated fluid pressure operated means actuated by the shifting of said diverter element from one area to the other for raising the respective bearer devices from the pile on the area from which the feeding means is being shifted, whereby the completed pile may be readily removed therefrom, electrical limit switches operated by the shifting of the diverter element from one of its positions to the other, and means operable by the closing of said respective switches for starting the conveyor which comprises the stacking area from which the diverter is being shifted.

21. In a sheet stacking machine of the class described, in combination, a supporting framework; a pair of spaced alternately usable stacking areas thereon, each comprising a conveyor operable to move completed piles from the machine; a distributing conveyor system for feeding series of successive sheets alternately to said stacking areas; a sheet diverting device in said system movable to different positions to direct sheets to one or the other of said areas; a sheet discarding system supported by said framework, and another portion of said distributing conveyor system movable to direct sheets to said discarding system; electric motors for driving the respective conveyors which comprise the stacking areas; a down-bearing element associated with each stacking area and adapted to press upon the successive top sheets of a pile as it is being formed; electro-pneumatic means for raising each of said down-bearing elements to an upper idle position enabling a completed pile to be borne off the area; manually actuated pneumatic means for moving said portion of said distributing conveyor system to sheet discarding position; electro-pneumatic means for moving said sheet diverting device to and from its respective distributing positions; an electrical counting mechanism, and photoelectric means actuated by successive passing sheets in advance of the diverting device for applying counting impulses to said counting mechanism; connections between said counting mechanism and said diverting device moving means whereby said diverting device is shifted from one of its operative positions to the other upon completion of a count corresponding to the desired number of sheets in a pile; electric switching means actuated by said sheet diverting device at its two respective limiting positions for initiating the closing of a circuit for effecting the operation of the actuating means for raising the down-bearing element associated with the stacking area from which the sheet diverting device has been shifted; switch means within each of said stacking areas adapted to be actuated by the arrival of the first sheet of a new pile thereon, for completing said circuit, whereby upon the completion of a pile on one area the sheets are diverted to the other area and upon the arrival of the first sheet thereon the down-bearing element of the first area is raised from the pile to its idle position, electrical switch means above each of said areas adapted to be actuated by said down-bearing element when raised, to complete a circuit to the motor driving the area-conveyor upon which the completed pile rests, to carry off the pile; and switch means associated with the discarding portion of the distributing conveyor system for interrupting the transmission of impulses to the counting mechanism upon movement of said portion to discarding position.

22. In a sheet stacking machine of the class described, in combination, a supporting framework; a pair of spaced alternately usable stacking areas thereon, each comprising a conveyor operable to move completed piles from the machine; a distributing conveyor system for feeding series of successive sheets alternately to said stacking areas; a sheet diverting device in said system movable to different positions to direct sheets to one or the other of said areas; a sheet discarding system supported by said framework, and another portion of said distributing conveyor system movable to direct sheets to said discarding system; driving means for the respective conveyors which comprise the stacking areas; a down-bearing element associated with each stacking area and adapted to press upon the successive top sheets of a pile as it is being formed; means for raising each of said down-bearing elements to an upper idle position enabling a completed pile to be borne off the area; means for moving said portion of said distributing conveyor system to sheet discarding position; means for moving said sheet diverting device to and from its respective distributing positions; a counting mechanism, and means actuated by successive passing sheets in advance of the diverting device for applying counting impulses to said counting mechanism; connections between said counting mechanism and said diverting device moving means whereby said diverting device is shifted from one of its operative positions to the other upon completion of a count corresponding to the desired number of sheets in a pile; means actuated by said sheet diverting device at its two respective limiting positions for initiating the operation of the actuating means for raising the down-bearing element associated with the stacking area from which the sheet diverting device has been shifted; means within each of said stacking areas adapted to be actuated by the arrival of the first sheet of a new pile thereon, for completing the actuating of said down-bearing element operating means, whereby upon the completion of a pile on one area the sheets are diverted to the other area and upon the arrival of the first sheet thereon the down-bearing element of the first area is raised from the pile to its idle position; means above each of said areas adapted to be actuated by said down-bearing element when raised, to start the driving means for the area-conveyor upon which the completed pile rests, to carry off the pile; and means associated with the discarding portion of the distributing conveyor system for interrupting the counting upon movement of said portion to discarding position.

23. In a sheet stacking machine of the class described, in combination, a supporting framework; a pair of spaced alternately usable stacking areas thereon, each comprising a conveyor operable to move completed piles from the machine, a distributing conveyor system for feeding series of successive sheets alternately to said stacking areas; a sheet diverting device in said system movable to different positions to direct sheets to one or the other of said areas; driving means for the respective conveyors comprising the stacking areas; a down-bearing element associated with each stacking area and adapted to press upon the successive top sheets of a pile as it is being formed; means for raising each of said down-bearing elements to an upper idle position enabling a completed pile to be borne off the area; means for moving said sheet diverting device to and from its respective distributing positions; a counting mechanism, and means actuated by successive passing sheets in advance of the diverting device for applying counting impulses to said counting mechanism; connections between said counting mechanism and said diverting device moving means whereby said diverting device is shifted from one of its operative positions to the other upon completion of a count corresponding to the desired number of sheets in a pile; means actuated by said sheet diverting device at its two respective limiting positions for initiating the operation of the actuating means for raising the down-bearing element associated with the stacking area from which the sheet dividing device has been shifted; means within each of said stacking areas adapted to be actuated by the arrival of the first sheet of a new pile thereon for completing the actuating of said down-bearing element operating means, whereby upon the completion of a pile on one area the sheets are diverted to the other area and upon the arrival of the first sheet thereon, the down-bearing element of the first area is raised from the pile to its idle position; and means above each of said areas adapted to be actuated by said down-bearing element when raised, to start the driving means for the area-conveyor upon which the completed pile rests, to carry off the pile.

24. In a sheet stacking machine of the class described, in combination, a supporting framework; a pair of spaced alternately usable stacking areas thereon, each comprising a conveyor operable to move completed piles from the machine; a distributing conveyor system for feeding series of successive sheets alternately to said stacking areas; a sheet diverting device in said system movable to different positions to direct sheets to one or the other of said areas, driving means for the respective conveyors comprising the stacking areas; means for moving said sheet diverting device to and from its respective distributing positions; a counting mechanism, and means actuated by successive passing sheets in advance of the diverting device for applying counting impulses to said counting mechanism; connections between said counting mechanism and said diverting device moving means whereby said diverting device is shifted from one of its operative positions to the other upon completion of count corresponding to the desired number of sheets in a pile; means actuated by said sheet diverting device at its two respective limiting positions for initiating the operation of the conveyor driving means of the area from which the sheet diverting device has been shifted; means within each of said stacking areas adapted to be actuated by the arrival of the first sheet of a pile thereon for completing the actuation of said driving means, whereby upon the completion of a pile on one area the sheets are diverted to the other area and upon the arrival of the first sheet thereon the driving means for the first area is actuated to drive the conveyor comprising the same.

25. In a sheet stacking machine of the class described, in combination, a supporting framework; a plurality of spaced alternately usable stacking areas thereon; a distributing conveyor system for feeding series of successive sheets alternately to said stacking areas; a sheet diverting device in said system movable to different positions to direct sheets to said areas; means for moving said sheet diverting device to and from its respective distributing positions; a plurality of counting mechanisms; and means actuated by successive passing sheets in advance of the diverting device for applying counting impulses to said counting mechanism successively; connections between said counting mechanisms and said diverting device moving means whereby said diverting device is shifted from one of its operative positions to another upon completion of a count corresponding to the desired number of sheets in a pile on a given stacking area; connections between said counting mechanisms for throwing automatically the succeeding mechanism into counting action upon completion of said count for one pile and thus starting a new count for the succeeding pile on the other stacking area; and means for prematurely terminating a count at will and thus moving the diverter and at the same time transferring the count to another mechanism.

26. In a sheet stacking machine of the class described, in combination, a supporting framework; a plurality of spaced alternately usable stacking areas thereon, a distributing conveyor system for feeding series of successive sheets alternately to said stacking areas; a sheet diverting device in said system movable to different positions to direct sheets to said areas; a sheet discarding system supported by said framework, and another portion of said distributing conveyor system movable to direct sheets to said discarding system; means for moving said portion of said distributing conveyor system to sheet discarding position; means for moving said sheet diverting device to and from its respective distributing positions; a plurality of counting mechanisms; and means actuated by successive passing sheets in advance of the diverting device for applying counting impulses to said counting mechanisms successively; connections between said counting mechanisms and said diverting device moving means whereby said diverting device is shifted from one of its operative positions to another upon completion of a count corresponding to the desired number of sheets in a pile on a given stacking area; connections between said counting mechanisms for throwing automatically the succeeding mechanism into counting action upon completion of said count for one pile and thus starting a new count for the succeeding pile on the other stacking area; means associated with the discarding portion of the distributing conveyor system for interrupting the transmission of impulses to the counting mechanisms upon movement of said conveyor portion to discarding position; and means for prematurely terminating a count at will and thus moving the diverter and at the same time transferring the count to another counting mechanism.

27. In a sheet stacking machine of the class described, in combination, a supporting framework, a belt conveyor pivoted at its receiving end to said framework, means for swinging said conveyor from a normal operating position for feeding sheets to a stacking area to a displaced position to direct the sheets to a carry-off conveyor, means for driving said last named conveyor, a fluid pressure cylinder carried by said framework, a piston therein, linkage connecting said piston with said first named conveyor, means for controlling the fluid pressure applied to said cylinder to raise and lower said conveyor, and a switch having an actuating element disposed in the path of a portion of said linkage and adapted to be closed to energize the carry-off conveyor driving means when said linkage and first named conveyor are moved to said displaced position.

28. In a sheet stacking machine of the class described, in combination, a stacking area to which the sheets are fed, a delivery conveyor member serving said stacking area and adapted to deliver piles therefrom, means for pivotally mounting the receiving end of said delivery conveyor member closely adjacent said stacking area, means for movably supporting the discharge end of said delivery conveyor, counter-balancing means, means for connecting said counter-balancing means to said discharge end of the conveyor, the force exerted by the counter-balancing means being such that when unloaded, the counter-balancing means overbalances the conveyor and maintains it in an elevated position, but is insufficient to counter-balance the weight of the conveyor together with the weight of a pile when received from said stacking area, whereby an oncoming pile causes the delivery conveyor to move downward to delivery position, means for rigidly connecting both sides of said delivery conveyor member with said counter-balancing means whereby the delivery conveyor member is effectively counter-balanced at both sides thereof regardless of the differential loading.

29. In a sheet stacking machine of the class described, in combination, sheet feeding means, a stacking area to which sheets of various predetermined lengths are fed, adjustable stop means for sheets fed to said area whereby the extent of the piles of said sheets longitudinally of said area is determined, a delivery conveyor member serving said stacking area and adapted to deliver piles therefrom laterally of said area, means for pivotally mounting the receiving end of said delivery conveyor member closely adjacent a side edge of said stacking area, means for movably supporting the discharge end of said delivery conveyor, counter-balancing means, means for connecting said counter-balancing means to said discharge end of the conveyor, the force exerted by the counter-balancing means being such that when unloaded, the counter-balancing means overbalances the conveyor and maintains it in an elevated position, but is insufficient to counter-balance the weight of the conveyor together with the weight of a pile when received from said stacking area, whereby an oncoming pile causes the delivery conveyor to move downward to delivery position, said counter-balancing means comprising a torque-sustaining rock shaft rotatably carried by a fixed support adjacent the delivery end of the delivery conveyor member, cranks rigidly splined to said rock shaft and extending therefrom at spaced points respectively adjacent the sides of said delivery conveyor member, links connecting said cranks respectively to the side portions of said delivery conveyor member, another crank element fixed to said rock shaft, and counter-balance devices acting upon said last named crank element at all times, all whereby the delivery conveyor member is effectively counter-balanced at both sides thereof regardless of differential loading due to variations in the length of the sheets of the delivered piles.

30. The sheet stacking machine set forth in claim 16, in which the bearer devices comprise a rotary structure adapted to contact the top sheets of a pile, side frame members extending from the lateral portions of said rotary structure, a rigid torque sustaining rock shaft rotatably mounted in the main frame, said side frame members being splined to said rock shaft, and in which said raising means comprises a substantially vertically movable element having a connection with but one of said side frame members, the rigid nature of the torque-sustaining rock shaft and the side frame elements which are splined thereto preventing any warping or sagging of the side of the bearer device to which the raising means is not connected.

WILMER W. WAGNER, Jr.
HENRY B. GREENWOOD.

REFERENCES CITED

The following references are of record in the file of this patent:

UNITED STATES PATENTS

| Number | Name | Date |
|---|---|---|
| 1,302,466 | Finster et al. | Apr. 29, 1919 |
| 1,736,482 | Broadmeyer | Nov. 19, 1929 |
| 1,752,681 | Maxson | Apr. 1, 1933 |
| 2,013,220 | Rosenthal | Sept. 3, 1935 |
| 2,315,003 | Martin et al. | Mar. 30, 1943 |
| 2,367,416 | Matthews | Jan. 16, 1945 |
| 2,375,241 | Lindgren et al. | May 8, 1945 |
| 2,392,032 | Domville et al. | Jan. 1, 1946 |
| 2,414,337 | Shields | Jan. 14, 1947 |